(12) United States Patent
Yoshida et al.

(10) Patent No.: US 8,014,661 B2
(45) Date of Patent: *Sep. 6, 2011

(54) IMAGING DEVICE AND IMAGING METHOD

(75) Inventors: Akihiro Yoshida, Yokohama (JP); Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/868,804

(22) Filed: Aug. 26, 2010

(65) Prior Publication Data

US 2010/0322611 A1    Dec. 23, 2010

Related U.S. Application Data

(63) Continuation of application No. 12/219,922, filed on Jul. 30, 2008, now Pat. No. 7,813,633.

(30) Foreign Application Priority Data

| Jul. 31, 2007 | (JP) | ................. | 2007-198979 |
| Sep. 4, 2007 | (JP) | ................. | 2007-229592 |
| May 28, 2008 | (JP) | ................. | 2008-139602 |

(51) Int. Cl.
*G03B 13/18* (2006.01)
*G03B 13/36* (2006.01)

(52) U.S. Cl. ....................... 396/103; 396/147

(58) Field of Classification Search .......... 396/89, 396/103, 133, 147
See application file for complete search history.

(56) References Cited

U.S. PATENT DOCUMENTS

| 6,614,998 | B1 | 9/2003 | Senba et al. |
| 6,982,750 | B1 | 1/2006 | Yoshida et al. |
| 7,180,543 | B2 | 2/2007 | Ojima et al. |
| 7,187,409 | B2 | 3/2007 | Nakahira et al. |
| 7,307,662 | B2 | 12/2007 | Yoshida et al. |
| 7,324,150 | B2 | 1/2008 | Shiraishi |
| 7,813,633 | B2 * | 10/2010 | Yoshida et al. ............. 396/103 |
| 2004/0169766 | A1 | 9/2004 | Yoshida |
| 2006/0029381 | A1 | 2/2006 | Onozawa |
| 2006/0061677 | A1 | 3/2006 | Yoshida |
| 2006/0133791 | A1 | 6/2006 | Miyata |
| 2007/0030369 | A1 | 2/2007 | Ojima et al. |
| 2007/0212055 | A1 | 9/2007 | Yoshida |
| 2008/0084487 | A1 | 4/2008 | Yoshida |
| 2008/0138055 | A1 | 6/2008 | Dunko et al. |
| 2008/0192139 | A1 | 8/2008 | Kanai et al. |
| 2008/0259172 | A1 | 10/2008 | Tamaru |

(Continued)

FOREIGN PATENT DOCUMENTS

EP    1 564 988 A2    8/2005

(Continued)

*Primary Examiner* — W. B. Perkey
(74) *Attorney, Agent, or Firm* — Dickstein Shapiro LLP

(57) ABSTRACT

An imaging device includes an autofocusing section, which moves at least a part of an imaging lens as a focusing lens, and focuses the imaging device on a subject, a photographing distance range setting section, which sets a predetermined distance range including a subject distance to the subject obtained by the autofocusing section as a photographing distance range for photographing, a continuous shooting section, which continuously photographs at a plurality of focused positions in the photographing distance range while moving and stopping the focusing lens according to input of a photographing instruction, and a display section, which displays an image of the subject focused by the autofocusing section and the photographing distance range set by the photographing distance range setting section.

20 Claims, 23 Drawing Sheets

U.S. PATENT DOCUMENTS

2009/0225199 A1 9/2009 Ferren
2009/0284641 A1 11/2009 Hirai

FOREIGN PATENT DOCUMENTS

| | | |
|---|---|---|
| JP | S39-5265 | 4/1964 |
| JP | 07-131698 | 5/1995 |
| JP | 10-108057 A | 4/1998 |
| JP | 2001-116979 | 4/2001 |
| JP | 2005-202064 | 7/2005 |
| JP | 2005-277813 | 10/2005 |
| JP | 2006-17960 A | 1/2006 |
| JP | 2007-028486 | 2/2007 |
| JP | 3934954 | 3/2007 |

* cited by examiner

IMAGING DEVICE AND IMAGING METHOD

PRIORITY CLAIM

The present application is a continuation of application Ser. No. 12/219,922, filed Jul. 30, 2008, now U.S. Pat. No. 7,813,633, which is based on and claims priority from Japanese Patent Applications No. 2007-198979, filed on Jul. 31, 2007, No. 2007-229592, filed on Sep. 4, 2007, and No. 2008-139602, filed on May 28, 2008, the disclosures of which are hereby incorporated by reference in their entirety.

BACKGROUND OF THE INVENTION

1. Field of the Invention

The present invention relates to an improvement in a continuous shooting function in an imaging device such as a digital still camera. More particularly, the present invention relates to an imaging device, which performs continuous shooting, while moving a focused position, and also to an imaging method in such an imaging device.

2. Description of the Related Art

An electronic imaging device such as a digital still camera (hereinafter, refer to a digital camera) generally includes an autofocusing (AF) system, which focuses a lens, camera, etc., automatically. As an AF control method in such an autofocusing system, for example, a control method such as a contrast method (sometimes, referred to as a bill-climbing servo) is widely used. One example of the contrast method is disclosed in JP S39-526513.

In this contrast method, an integration value of luminance differences of adjacent pixels or a high frequency component of picture signals from the picture signals obtained with respect to one filed or one frame is obtained, so as to use this value as an AF evaluation value showing a focused degree. In a focused state, the AF evaluation value is increased because the edge part of a subject is clear, whereas in a non-focused state, the AF evaluation value is decreased. In the AF operation, this AF evaluation value is sequentially obtained while moving a lens, and the lens is stopped at a position as a focused point in which the AF evaluation values is the maximum.

In general, accurate focusing is required for a device which images a still image such as a digital camera, compared with a device which photographs a motion picture such as a video camera. For this reason, in such a device, the AF operation is conducted in every photographing operation, or the focusing operation is constantly repeated in a recording mode.

However, when a plurality of subjects each located in a different position is displayed on a screen, or the contrast of a subject is low, an image focused on a position different from a position intended by a photographer may be photographed.

In order to solve such a problem, for example, JP H07-131698A discloses a technique which photographs the designated number of images in a focused position detected by an AF operation and positions in the anteroposterior thereof, so as to enable the photographing of a desired image. In this technique, when a plurality of subjects is located in different positions, a subject detected as the focused position in the AF operation is not always a desired subject of a photographer. More particularly, when a desired subject is located outside the photographed distance range, the photographed images do not include a desired image, as a result, the photographed images are all wasted.

Moreover, for example, JP2001-116979A discloses a technique which performs photographing a plural number of times with respect to the detected subjects located in different positions as the focused points. However, in this technique, since the photographing is conducted in the focused position selected by a camera, when a plurality of subjects each having a contrast higher than the contrast of a subject intended by a photographer is located, the subject intended by the photographer is not selected as a photographing target. For this reason, in this technique, it is necessary to confirm whether or not the photographing corresponding to a desired distance is performed after photographing.

On the other hand, for example, JP2005-277813A discloses a technique which selects an area on a screen desired for focusing, after photographing all images in a photographing distance range, so as to select an image focused on that area. In addition, for example, JP 2007-28486A discloses a technique which stores an image selected by a camera or a user in a memory card after photographing all images in a photographing range.

In this case, the shorter the subject distance or the larger the focal length, the narrower the range of the depth of field is obtained. Accordingly, in order to photograph by changing a focused position while maintaining a focused state, it is required that photographing is conducted a plural number of times.

The techniques disclosed in JP2005-277813A and JP2007-28486A can reduce errors when the number of pixels of a recording target is small, but the techniques require a significantly high-capacity buffer memory for storing an image when the number of pixels of an image sensor is large.

For example, it depends on the spec of an optical system, but a digital camera, which uses a 1/2.5 type image sensor having 8 million pixels to 10 million pixels, requires photographing of about 30 pictures from a close distance to infinity at the wide-angle side, and photographing of about 70 pictures from a close distance to infinity at the telephoto side. However, when using such an image sensor, even if a 1 G bit image buffer memory is used, the image sensor processes only about 10 images at one time.

Therefore, in order to obtain an image focused on a desired subject, it is ideal to photograph all images at focused positions from a close distance to infinity. However, considering the costs, the control of the photographing distance range is unavoidable in terms of limitation regarding the memory capacity and the processing speed.

In this case, if an image is stored with respect to each photographing while being compressed, it is not necessary to use a large-capacity buffer memory. However, a longer time for a process of each image is required, and the repeated photographing interval is increased. For this reason, it becomes difficult to sequentially photograph a moving subject. On the other hand, it is possible to solve a problem of time lag by using an ultra high-speed system, but it consumes a significant amount of power.

Moreover, JP2005-202064A discloses a technique which displays on a screen the position of the present focus lens and the focused range of that state before sequentially obtaining AF evaluation values. In this case, a photographer can modify the focused range according to the display of the position of the focus lens and the focused range of that state, and the blurring of the subject on the screen. After that, the AF operation is conducted in response to the half-pressing of the release button, and only one picture is taken in response to the full-pressing of the release button.

The above-described techniques are examples of focus bracketing photographing or a focus continuous shooting, and a technique which conducts photographing in the positions of a lens disposed anteroposterior of the focused point determined by a camera. More particularly, a technique, which photographs a plurality of images while changing a parameter originally used in exposure, is applied to focusing, this technique being know as focus bracketing photographing.

In addition to the above techniques, various techniques which photograph all images in a photographing distance area by changing a lens position at predetermined intervals, and store the images, so as to correspond photographing intent of a photographer after photographing. JP3934954B also discloses a technique which changes an operation such that a focusing operation is re-conducted when the focused state is maintained.

SUMMARY OF THE INVENTION

It is, therefore, an object of the present invention to provide an imaging device and an imaging method, which can automatically set a photographing distance range of a continuous shooting target, so as to be previously confirmed, and effectively focus on a desired subject with a relatively small number of images.

An imaging device according to one embodiment of the present invention includes an autofocusing section, which moves at least a part of an imaging lens as a focusing lens, and focuses the imaging device on a subject, a photographing distance range setting section, which sets a predetermined distance range including a subject distance to the subject obtained by the autofocusing section as a photographing distance range for photographing, a continuous shooting section, which continuously photographs at a plurality of focused positions in the photographing distance range while moving and stopping the focusing lens according to input of a photographing instruction, and a display section, which displays an image of the subject focused by the autofocusing section and the photographing distance range set by the photographing distance range setting section.

Preferably, the photographing distance range is displayed on the display section when a first predetermined operation is conducted, and the photographing is conducted by the continuous shooting section in the photographing distance range displayed on the display section and photographing data is recorded when a second predetermined operation is conducted.

Preferably, the photographing distance range setting section sets a plurality of photographing distance ranges according to a maximum value of the focal point evaluation value, and the plurality of photographing distance ranges is sequentially displayed on the display section for every first predetermined operation, and the photographing is conducted by the continuous shooting section in the photographing distance range displayed on the display section and photographing data is stored when a second predetermined operation is conducted.

Preferably, the imaging device according to one embodiment of the present invention further includes a depth of field obtaining section, which obtains information of a depth of field in the focused position. The photographing distance range setting section sets a plurality of photographing distance ranges according to at least 2 maximum values of the focal point evaluation values which are included in the depth of field obtained by the depth of field obtaining section and are adjacent to each other, and the plurality of photographing distance ranges is sequentially displayed on the display section for every first predetermined operation, and the photographing is conducted by the continuous shooting section in the photographing distance range displayed on the display section and photographing data is recorded when a second predetermined operation is conducted.

Preferably, the display section displays the photographing distance range on which the focused position by the autofocusing section is overlapped.

Preferably, the imaging device according to one embodiment of the present invention further includes a photographing distance range changing section, which changes the photographing distance range.

Preferably, the display section displays the photographing distance range according to change in the photographing distance range by the photographing distance range changing section.

Preferably, the photographing distance range changing section changes the photographing distance range according to a third predetermined operation.

Preferably, the photographing distance range setting section selects a plurality of the photographing distance ranges relative to a plurality of the subject distances, and the photographing distance range changing section sequentially changes the plurality of photographing distance ranges according to the first predetermined operation.

Preferably, the photographing distance range changing section changes the photographing distance range based on change in a condition of the subject according to the first predetermined operation.

Preferably, the photographing distance range changing section changes the photographing distance range according to a time interval of the first predetermined operation.

Preferably, the imaging device according to one embodiment of the present invention further includes a warning section, which warns that the photographing distance range is not set when a predetermined photographing start instruction is detected before setting the photographing distance range by the photographing distance range setting section.

An imaging method according to one embodiment of the present invention includes an autofocusing step, which moves at least a part of an imaging lens as a focusing lens, and focuses the imaging device on a subject, a photographing distance range setting step, which sets a predetermined distance range including a subject distance to the subject obtained by the autofocusing step as a photographing distance range for photographing, a continuous shooting step, which continuously photographs at a plurality of focused positions in the photographing distance range while moving and stopping the focusing lens, and a display step, which displays an image of the subject focused by the autofocusing step and the photographing distance range set by the photographing distance range setting step.)

Preferably, the photographing distance range is displayed by the display step when a first predetermined operation is conducted, and the photographing is conducted by the continuous shooting photographing step in the photographing distance range displayed by the display step and the photographing data is recorded when a second predetermined operation is conducted.

Preferably, the photographing distance range setting step sets a plurality of photographing distance ranges according to a maximum value of the focal point evaluation value, and the display step sequentially displays the plurality of photographing distance ranges for every first predetermined operation, and the photographing is conducted by the continuous shooting step in the photographing distance range displayed by the display step and photographing data is recorded when a second predetermined operation is conducted.

Preferably, the imaging method according to one embodiment of the present invention further includes a depth of field obtaining step, which obtains information of a depth of field in the focused position. The photographing distance range setting step sets a plurality of photographing distance ranges according to at least 2 maximum values of the focal point evaluation values which are included in the depth of field obtained by the depth of field obtaining step and are close to each other, and the display step sequentially displays the plurality of photographing distance ranges for every first predetermined operation, and the photographing is conducted by the continuous shooting step in the photographing distance range displayed by the display step and the photographing data is recorded when a second predetermined operation is conducted.

Preferably, the display step images the photographing distance range on which the focused position by the autofocusing step is overlapped.

Preferably, the imaging method according to one embodiment of the present invention further includes a photographing distance range changing step, which changes the photographing distance range.

Preferably, the display step changes the photographing distance range according to change in the photographing distance range by the photographing distance range changing step.

Preferably, the photographing distance range changing step changes the photographing distance rage according to a third predetermined operation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Hereinafter, an imaging device and an imaging method according to the embodiments of the present invention will be described with reference to the drawings.

Figure 1:
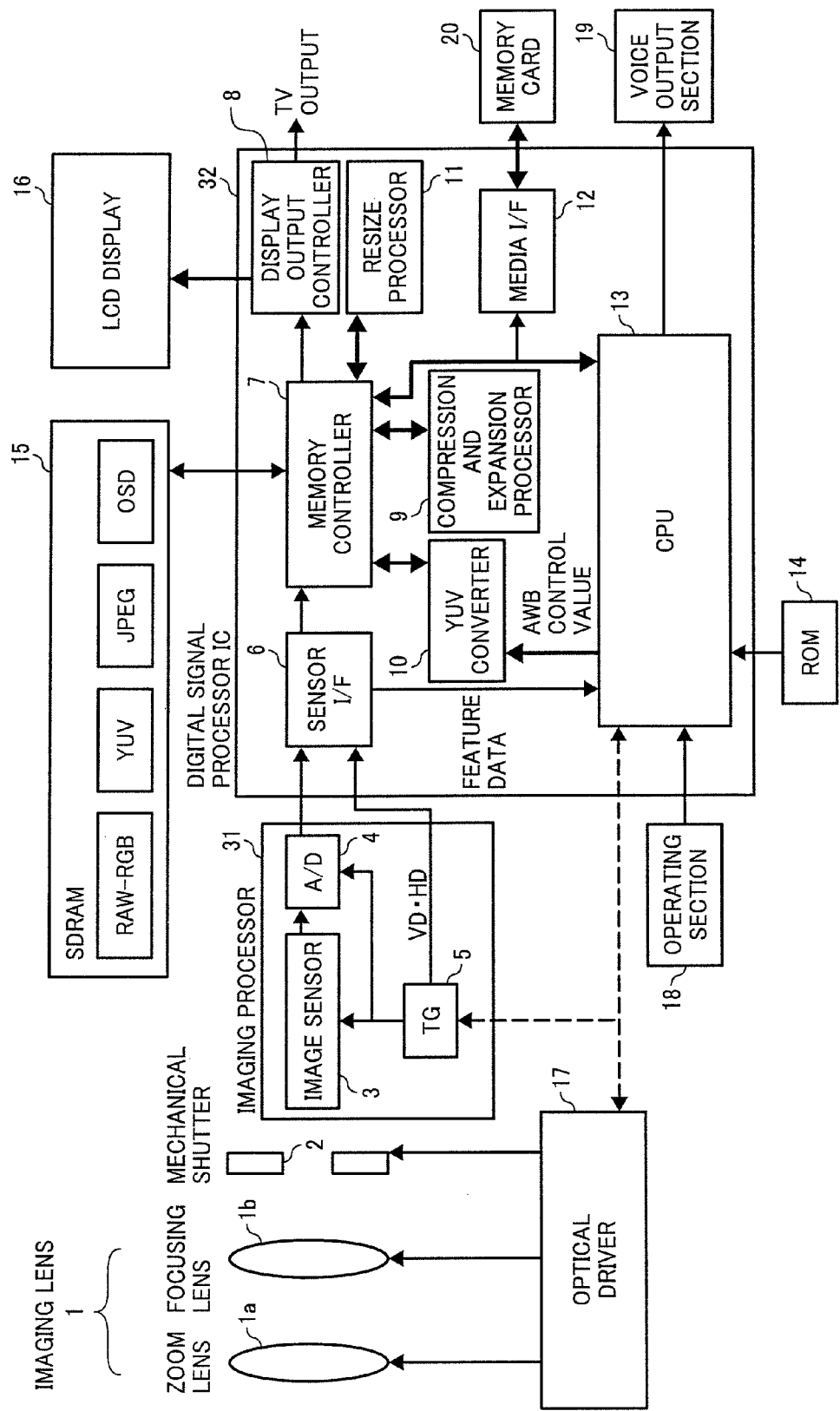
FIG. 1 is a block diagram illustrating a general system structure of a digital camera according to a first embodiment of the present invention.

As illustrated in FIG. 1, the digital camera according to the present embodiment includes an imaging lens 1 having a zoom lens 1a and a focusing lens 1b, a mechanical shutter 2, an image sensor 3, an A/D converter (A/D) 4, a timing generator (TG) 5, a sensor interface (sensor I/F) 6, a memory controller 7, a display output controller 8, a compression processor 9, a YUV converter 10, a resize processor 11, a media interface (media I/F) 12, a CPU (central controller) 13, a ROM (read-only memory) 14, a frame memory (SDRAM) 15, a liquid crystal display (LCD) 16, an optical system driver 17, an operating section 18, a voice output section 19, and a memory card 20.

The image sensor 3, the A/D converter 4 and the timing generator 5 constitute an imaging processor 31. The sensor interface 6, the memory controller 7, the display output controller 8, the compression processor 9, the YUV converter 10, the resize processor 11, the media interface 12, and the CPU 13 are provided in a digital signal processor IC (integrated circuit) 32.

The imaging lens 1 is an optical system which forms an optical image of a subject onto the light-receiving face of the image sensor 3. In this case, the imaging lens 1 is a zoom lens having the zoom lens 1a for a zooming operation and the focusing lens 1b for a focusing operation. The mechanical shutter 2 is disposed inside the imaging lens 1 or in the optical path between the imaging lens 1 and the image sensor 3, opens and closes the optical path, and controls the exposure of the image sensor 3.

The imaging processor 31 including the image sensor 3, the A/D converter 4 and the timing generator 5 operates as a front-end which processes the imaging output signals of the image sensor 3. In this case, the image sensor 3 includes a CMOS solid-state image sensor having a CMOS (complementary metal-oxide semiconductor) as a light-receiving element or a CCD solid-state image sensor having a CCD (charge coupled device) as a light-receiving element. The image sensor 3 also includes a CDS (correlation double sampling) circuit which performs correlation double sampling on the output image signals of the light-receiving element and an AGC (automatic gain control) circuit which adjusts the output of the correlation double sampling of the CDS circuit to a desired signal level by conducting automatic gain control.

The image sensor 3 converts an optical image entered on the light-receiving face at the exposed state into electric signals, and temporarily stores the signals, so as to transfer the image data. The A/D converter 4 converts the analogue output of the image sensor 3 into the digital data. The timing generator 5, together with the CPU 13, provides a VD signal (vertical synchronization driving signal) and an signal (horizontal synchronization signal) which are synchronization driving signals to the sensor interface 6 of the digital signal processor IC 32, and provides timing signals to the image sensor 3 and the A/D converter 4, and appropriately synchronizes these signals.

The digital signal processor IC 32 stores the digital image data provided via the A/D converter 4 of the imaging processor 31 into the frame memory 15. In addition, the digital signal processor IC 32 performs a desired signal process such as compression and YUV conversion, stores the data processed in the digital signal processing IC 32, displays the image data or the like provided from the A/D converter 4 or taken out from the frame memory 15 onto the LCD display 16, conducts the compression process of the digital image data provided from the A/D converter 4 or taken out from the frame memory 15, and a YUV conversion and resize process, and stores the digital image data taken out from the frame memory 15 into the memory card 20 via the media interface 12.

The sensor interface 6 receives the digital image data provided from the A/D converter 4 of the imaging processor 31, and stores the data into the frame memory 15 via the memory controller 7.

The memory controller 7 controls the writing into the frame memory 15 and reading out from the frame memory 15 of the original RUB (RAW-RUB) data provided via the sensor interface 6, the YUV data converted in the YUV converter 10, the JPEG data compressed by the JPEG (Joint Photographic Experts Group) method, for example, in the compression processor 9, the OSD (On-Screen Display) image data, and the like according to the control of the CPU 13.

The display output controller 8 displays the image data read oat from the frame memory 15 on the LCD display 16, and outputs the TV output for displaying on an external TV (television) or the like.

The compression processor 9 compresses the image data or the like provided from the A/D converter 4 or taken out from the frame memory 15 with a predetermined compression method such as the JPEG method.

The YUV converter 10 converts the image data provided from the A/D converter 4 or taken out from the frame memory 15 according to the auto white balance (AWB) control value provided from the CPU 13.

The resize processor 11 resizes the image data provided from the A/D converter 4 or taken out from the frame memory 15 to a different size.

The media interface 12 writes the image data provided from the A/D converter 4 or taken out from the frame memory 15 into the memory card 20 according to the control of the memory controller 7 and the CPU 13.

More particularly, the memory controller 7 stores the image data provided from the A/D converter 4, and takes out the image data from the frame memory 15, so as to display on the LCD display 16 via the display output controller 8. The memory controller 7 also takes out the image data from the frame memory 15, performs the compression process such as the JPEG method by the compression processor 9, the YUV conversion by the YUV converter 10, and the resize process by the resize processor 11, and writes the data after being compressed, converted and resized into the frame memory 15. The memory controller 7 also takes out the data from the frame memory 15, so as to write the data into the memory card 20.

The ROM 14 stores the operation program, the data and the like of the CPU 13.

The CPU 13 performs various processes regarding the photographing operation in accordance with the program and data read out from the ROM 14.

The frame memory 15 includes a semiconductor memory such as an SDRAM (synchronous dynamic random access memory), and stores the original RGB data, the YUV data, the JPEG data, the OSD image data and the like.

The LCD display 16 is a display device capable of displaying an image. The LCD display 16 displays the image data supplied from the A/D converter 4 or taken out from the frame memory 15, and provided via the display output controller 8, and also displays desired information.

The optical driver 17 drives lens driving motors (not shown) of the zoom lens 1a, the focus lens 1b and the like of the imaging lens 1 for zooming, focusing and the like, according to the control of the CPU 13. The optical driver 17 also drives a driving motor (not shown) of the mechanical shutter 2 in conjunction with the timing generator 5 for the opening and closing operation of the shutter.

The operating section 18 includes a shutter release button which directs the photographing, a mode dial for switching between various operation modes, other buttons, and at least a part of an operation device such as a key, a lever and dial, and performs an operation for providing to the CPU 13 information such as an operation instruction, a setting instruction and a selection instruction relative to a digital camera.

The voice output section 19 outputs sounds such as warnings and announcements.

The memory card 20 is a small IC memory recording medium, which incorporates a semiconductor non-volatile memory such as a flash memory, and is used as an external recording medium detachable from a digital camera.

The memory card 20 is detachably attached to a memory card slot disposed in a digital camera, for example. The memory card 20 takes out the image data compressed by the JPEG method or the like in the frame memory 15 from the frame memory 15 via the memory controller 7, and stores the data as the photographing results according to the control of the CPU 13.

Figure 2:
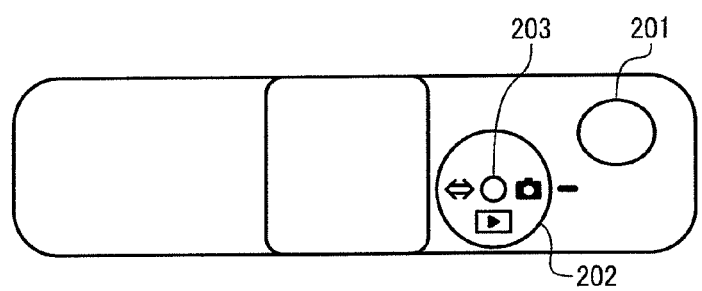
FIG. 2 is a top view illustrating the digital camera according to the first embodiment of the present invention.
Figure 3:
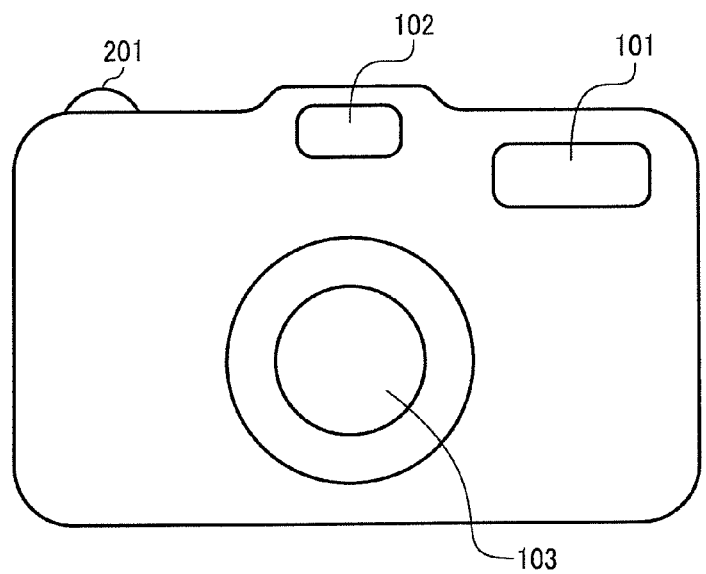
FIG. 3 is a front view illustrating the digital camera according to the first embodiment of the present invention.
Figure 4:
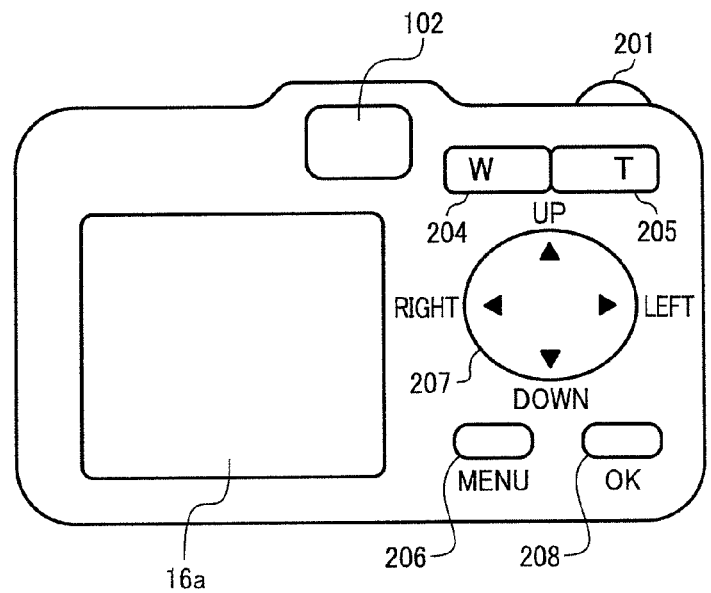
FIG. 4 is a back view illustrating the digital camera according to the first embodiment of the present invention.

As illustrated in FIGS. 2-4, the digital camera includes a LCD display 16a on the back face of the body. This LCD display 16a constitutes the LCD display 16 in FIG. 1. The LCD display 16a displays an image and various conditions according to imaging. As the LCD display 16, a sub LCD display for displaying various symbols mainly illustrating a film counter, date/time, and an operation condition may be provided, in addition to the LCD display 16a. When the sub LCD display is not provided, information such as the various symbols illustrating a film counter, data/time, and an operation state is also displayed on the LCD display 16a.

The upper face of the body includes a shutter release button 201 and a mode dial 202 for switching between photographing and reproducing. The mode dial 202 includes in the central portion thereof a power source button 203 for turning on and off the power source.

The back face of the body includes a wide-angle side (W) zoom button 204, a telephoto side (T) zoom button 205, a menu bottom 206, an Up/Down/Right/Left button 207, and an OK button 208. These buttons and the dial constitute the operating section 18 in FIG. 1.

The front face of the body includes a stroboscopic light-emitting section 101, an objective face of an optical finder 102, and a lens barrel unit 103 of the photographing lens. The back face of the body includes an eyepiece section of the optical finder 102.

The following sections are realized by the control of the CPU 13, for example. An autofocusing section which automatically focuses the focusing lens 1b on a subject, a continuous shooting section which continuously performs photographing on a plurality of focused positions in a predetermined target distance range while repeating the movement and stopping of the focusing lens 1b, a photographing distance range setting section which determines a predetermined distance range including a subject distance selected by the autofocusing section as a photographing distance range of continuous shooting by the continuous shooting section, a display section which displays the image of the subject focused by the autofocusing section and the photographing distance range set by the photographing distance range setting section on the LCD display 16, for example, a superimposed display section which superimposes the position (subject) focused by the autofocusing section with the photographing distance area for displaying, a photographing distance range changing section which changes a photographing distance range as desired, a distance range changing display section which changes a photographing distance range to be displayed on the display section according to the change in the photographing distance range by the photographing distance range changing section, and an alarm section which warns that a photographing distance range has not been decided yet when detecting a photographing start instruction before setting a photographing distance range by the photographing distance range setting section.

In the above structure, at first, the operation of the digital camera will be briefly described.

Moreover, the CPU 13 can calculate a distance to a subject (subject distance) by the focused position detected by the autofocusing section. More particularly, the subject distance can be obtained by the AF operation.

The operation mode is set to the photographing mode by operating the mode dial 202 (FIG. 2) of the operating section 18 (FIG. 1), and the digital camera is activated in the photographing mode by pressing the power source button 203. The mode dial 202 and the power source button 203 are provided in the operating section 18 in FIG. 1. When the CPU 13 detects that the power source button 203 is turned on in the photographing mode of the mode dial 202, the CPU 13 controls the optical system driver 17, and moves the lens barrel unit 103 to a photographable position. Furthermore, the CPU 13 powers on each section such as the imaging processor 31 and the LCD display 16, so as to start the operation of each section.

If each of the sections is powered-on, the operation of the finder mode is started. In this finder mode, a subject optical image imaged via the imaging lens 1 and incident on the image sensor 3 using a CMOS image sensor, for example, in the imaging processor 31 is sent to the A/D converter after converting into the electric signals. The signals converted into the digital ROB signals of the RAW-ROB format by the A/D converter 4 are converted into the YUV signals which are the displayable format by the YUV converter 10 in the digital signal processor IC 32, and the signals are written in the frame memory 15 by the memory controller 7. The YUV signals are read out by the memory controller 7, are output as the TV output via the display output controller 8, or are sent to the LCD display 16 to be displayed on the LCD display 16. This process is the display of the finder mode as a so-called electric finder, which is conducted at 1/30 second intervals and is updated every 1/30 second.

In this case, if the image sensor 3 is a CMOS image sensor having 8 million pixels, for example, all pixel signals can be output every 1/30 second when photographing a still image. In the finder mode, the number of pixels is reduced to 640×480 pixels every 1/30 second by the combination of adding and skipping regarding peripheral pixels, and the pixel signals are displayed.

The sensor interface 6 of the digital signal processor IC 32 calculates an AF (autofocusing) evaluation value showing a focused degree of a screen, an AE (auto-exposure) evaluation value detecting a subject brightness, and an AWE (auto while balance) evaluation value detecting a subject color according to the digital RGB signals taken into the sensor interface 6. These data are read into the CPU 13 as feature data, and used for each process of AF, AE and AWB.

The AF evaluation value is obtained by an output integration value of a high frequency extraction filter and an integration value of a brightness difference of adjacent pixels, for example. Since the edge portion of the subject is clear in the focused state, the maximum high-frequency component is obtained. By using this feature, the AF control is performed with the maximum AF evaluation point as the focused position.

The AE evaluation value and the AWB evaluation value are obtained from each integration value of R, G and B signals. For instance, a screen is divided into equal 256 areas (32 divisions in the horizontal and 32 divisions in the vertical), and the RGB integration value, i.e., the integration value of each area is calculated. The CPU 13 reads out the ROB integration value. In the AE, the brightness of each area is calculated, and an appropriate exposure time as the AE control value is determined from the brightness distribution.

In the AWB, the AWB control value corresponding to the color of the light source is determined from the ROB distribution. The AE process and AWB process are continuously conducted when in the finder mode.

If the shutter release button 201 in FIG. 2 is operated, the AF operation to detect a focused position and the still image recording process are performed. If the shutter release button 201 is pressed, the still image photographing start signal is taken into the CPU 13 from the operating section 18 in FIG. 1, and the CPU 13 conducts the above-described hill-climbing AF control by driving the focusing lens 1b of the imaging lens 1 via the optical system driver 19 in synchronization with the frame rate.

When the AF target range is the entire range from a close distance to infinity, the focusing lens 1b moves to each focused position from a close distance to infinity or infinity to a close distance, and the CPU 13 reads out the AF evaluation value in each frame (=each focused position) obtained in the digital signal processor IC 32. Then, the focusing lens 1b moves to the focused position in which the AF evaluation value of each focused position becomes the maximum.

After completing the AF operation, the analogue RGB signals output from the image sensor 3 are converted into the digital ROB signals, and stored in the frame memory 15 via the digital signal processor IC 32. The digital ROB signals are again read into the digital signal processor IC 32, converted into the YUV data, and written back to the frame memory 15.

When imaging a still image, the YUV converted image data is sent to the compression and expansion processor 9 having an image compression and expansion circuit in the digital signal processor IC 32. The YUV data sent to the compression and expansion processor 9 is compressed, and written back to the frame memory 15. The compression data of the frame memory 15 is again read out via the digital signal processor IC 32, and is stored in a memory for recording data such as a memory card 20.

Figure 5:
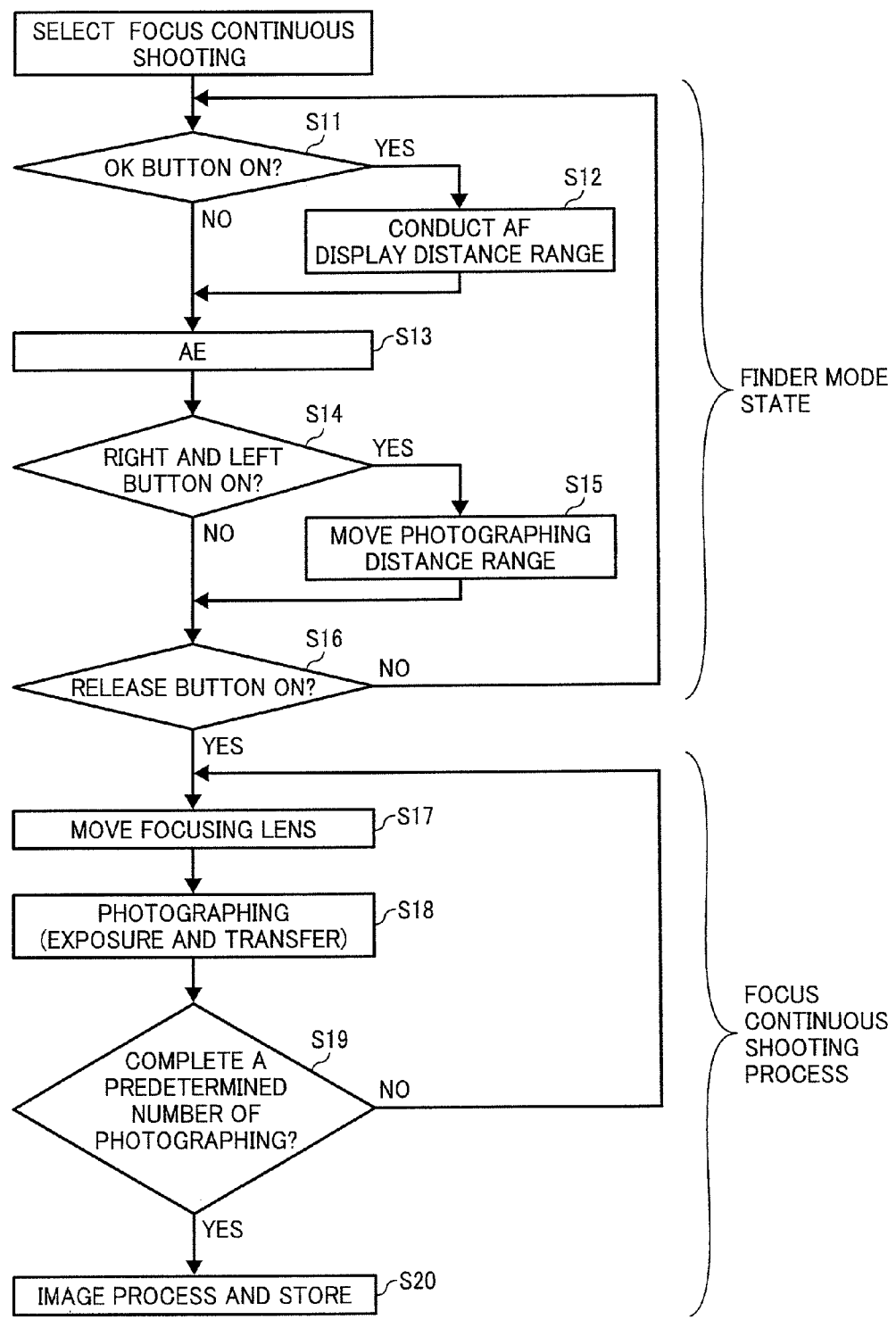
FIG. 5 is a flow chart illustrating the operation of the digital camera according to the first embodiment of the present invention.

Next, the operation of a digital camera according to a first embodiment of the present invention will be specifically described. At first, a so-called focus bracketing mode, which is a characteristic operation of the present invention for performing continuous shooting while moving a focused position, will be described with reference to the flow chart in the focus bracketing mode illustrated in FIG. 5.

Figure 6:
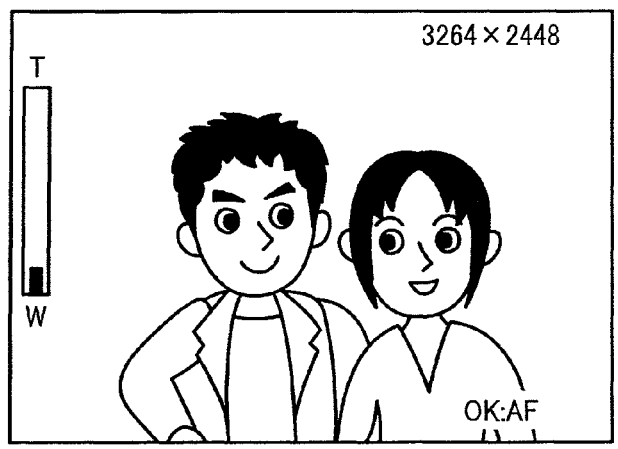
FIG. 6 is an example illustrating the display of the digital camera according to the first embodiment of the present invention.

If the menu bottom 206 (FIG. 4) of the operating section 18 (FIG. 1) is pressed, a selection can be made as to whether to conduct the focus bracketing photographing, which performs continuous shooting while moving a focused position, by the interactive operation on the screen of the LCD display 16. In this case, by selecting the focus bracketing photographing, and pressing the OK button 208 in FIG. 4, the operation mode is set to the focus bracketing mode, and the display of the LCD display 16 returns to the finder mode as illustrated in FIG. 6.

At first, Table 1 illustrates an example in which the number of points required for moving the focusing lens 1b considering a focused depth in a focusing range is calculated. Table 1 illustrates an example of the number of detected points of the focused position relative to the zooming position (wide end and telephoto end) when the focused range of 1 to 30 cm is a macro mode and the focused range farther than that is a normal mode.

TABLE 1

| Focused Range | Normal<br>(Infinity to 30 cm) | Macro<br>(30 cm to 1 cm) |
| --- | --- | --- |
| The number of focused positions at the wide end | 10 positions | 120 positions |
| The number of focused positions at the telephoto end | 70 positions | 250 positions |

In the zoom lens, the number of the focused points which should be moved by the zoom positions is significantly different even in the same photographing distance range. More particularly, the number of points increases on the telephoto side. In addition, the number of points increases in the photographing distance range of the macro area.

The digital camera according to the present embodiment includes 8 million pixels. In the continuous shooting, the data is obtained at a high speed, and one pixel is stored in the frame memory (SDRAM) 15 as 12 bits RAW data. An image having 3264×2448 pixels uses a 12 MB memory. The SDRAM capacity of the frame memory 15 is, for example, 128 MB. In this case, the SDRAM of the frame memory 15 also includes a work RAM of program data for operating the CPU 13, a work RAM for display data of an OSD (on-screen display) and a natural image (for example, an image formed according to image data photographed by a digital camera, for example, image data such as a still image recorded with a JPEG format, bit map format or the like), and a work RAM for image processing. Therefore, the number of photographed images with the RAW data format which can be stored in the work RAM is 8 images at a maximum. For this reason, in the general photographing of 8 images, the photographing in the entire range (positions) of the focused range which becomes the photographing target can not be conducted at one time, so it is necessary to selectively photograph partial focused points.

In this case, when selectively photographing a part of the focused range as a photographing distance range, several methods can be used as methods for selecting a photographing distance range. Hereinafter, a first method for selecting a photographing distance range will be described.

Figure 7:
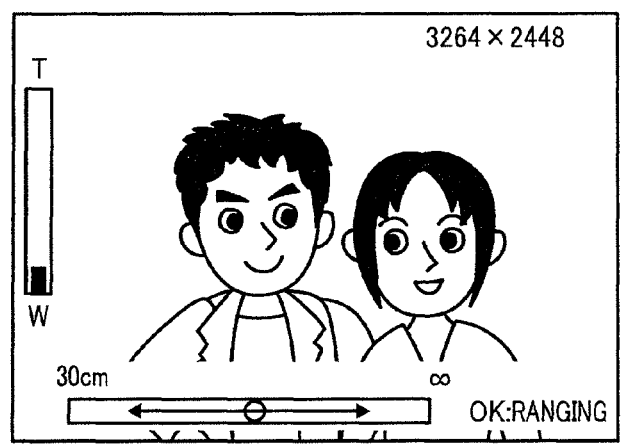
FIG. 7 is another example illustrating the display of the digital camera according to the first embodiment of the present invention.
Figure 8:
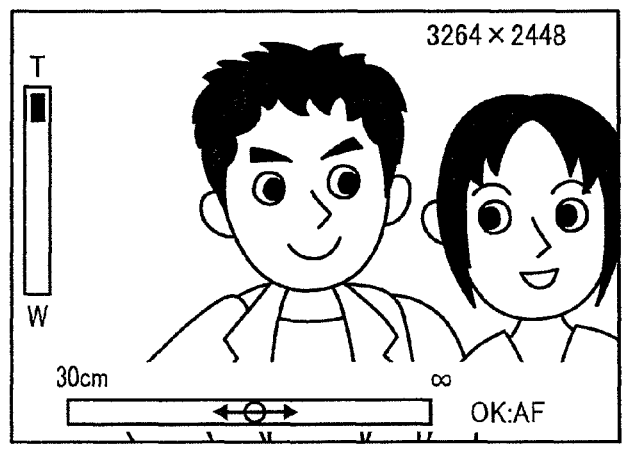
FIG. 8 is another example illustrating the display of the digital camera according to the first embodiment of the present invention.

In the focus bracketing mode, the AF operation is performed prior to photographing. If the OK button 208 is pressed in a state illustrated in FIG. 6 of the finder mode in which the photographing distance range is not set (step S11), the focused position is detected by the hill-climbing AF, and the photographing distance range is displayed (step S12). FIG. 7 illustrates the display after the AF operation when the zoom position is on the wide-angle (wide: W) side. FIG. 8 illustrates the display after the AF operation when the zoom position is on the telephoto (tele: T) side. The horizontal bar displayed on the lower end of the screen illustrates the entire focused range. The mark "o" in the horizontal bar represents the detected focused position, and the range illustrated by the arrows represents the photographing distance range which becomes the photographing target in the continuous shooting of 8 images. IP this case, the focusing lens 1b is located corresponding to the focused position illustrated by the mark "o".

At Step 12, the AF operation is conducted, and the AE process is conducted in a state in which the photographing distance range is displayed. In addition, when the OK button 208 is not pressed at Step 11, the AE process is conducted (Step 13). If the right and left of the button 207 of the operating section 18 are pressed (Step 14), the photographing distance range is moved (Step 15). In a state in which the photographing distance range is moved at Step 15, it is determined whether or not the release button 201 is pressed (Step 16).

In addition, if the right and left of the button 207 are not pressed at Step 14, it is determined whether or not the release button 201 is pressed at Step 16. When it is determined that the release button 201 is not pressed at Step 16, it is determined whether or not the OK button 208 is pressed after returning to Step 11.

Figure 9:
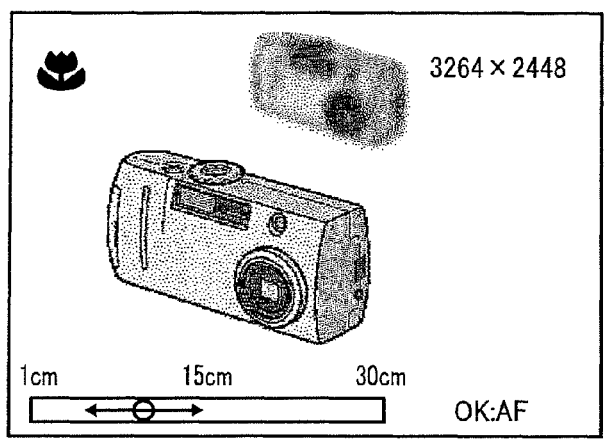
FIG. 9 is another example illustrating the display of the digital camera according to the first embodiment of the present invention.
Figure 10:
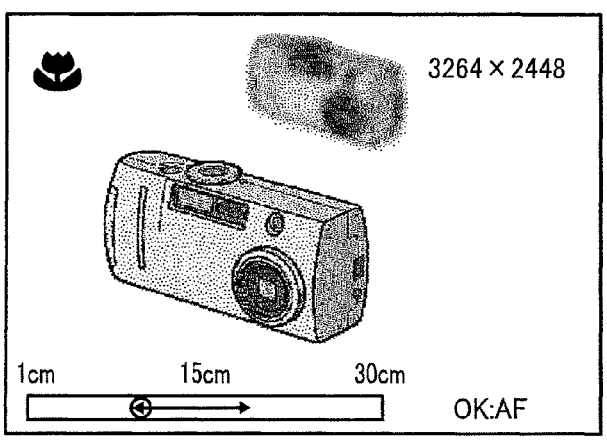
FIG. 10 is another example illustrating the display of the digital camera according to the first embodiment of the present invention.

As described above, when the photographing is conducted within the photographing distance range displayed on the screen, the photographing operation is started by pressing the shutter release button 201. When the photographing distance range is changed according to the displayed photographing distance range, the position of the photographing distance range can be corrected by the right and left of the button 207. FIG. 9 illustrates the display screen in a state in which the AF operation is completed after performing the AF operation by the OK button 208 in the macro mode. FIG. 10 illustrates the display screen in a state in which the photographing distance range is changed by pressing the right and left of the button 207.

In this case, if the zoom position is changed by pressing the zoom button 204 or the zoom button 205, the screen condition is changed. Therefore, the data of the subject distance obtained by the AF operation becomes invalid, and the screen goes back to the state illustrated in FIG. 6. If the OK button 208 is pressed again (corresponding to a first predetermined operation), the AF operation is re-performed, and the subject distance is re-obtained.

As described above, since the photographing distance range can be changed while observing the display screen, it is very convenient for photographing. It is also very effective especially in the macro photographing mode in which the depth of field is narrow and the focusing is strict because it can be easily determined whether or not the photographing distance range is appropriate from the blurred degree of the display screen.

In a state in which the photographing distance range is decided by the above operation, if the release button 201 is pressed, the photographing is started. If the CPU 13 detects that the release button 201 is pressed at Step 16, the focusing lens 1b is moved to the initial position of the photographing distance range of the continuous shooting (Step 17). For example, the focusing lens 1b is moved to the point in which the focused position in the photographing distance range is the front side (digital camera side). In this position, the focusing lens 1b is stopped, and the subject is exposed by the exposure time determined at Step 13 of the finder mode, and the entire pixel data of 8 million pixels is transferred to the frame memory 15, so as to be stored as the RAW data (Step 18).

After that, if a predetermined number of pictures are not photographed (Step 19), the focusing lens 1b is moved to the next focused position after returning to Step 17, and is stopped, and then the exposure and the transfer of the pixel data are again conducted at Step 18. Or, while reading out the pixel data, the focusing lens 1b is moved to the next focused position, and the next exposure may be conducted at a point when the reading out of the pixel data and the movement of the focusing lens 1b are completed. Such operation is repeated in the set photographing distance range (in this case, 8 points) till it is determined that the predetermined number of pictures is photographed at Step 19.

If all image data of the predetermined number of photographing times (in this case, 8 times) is obtained, the image process is started. At first, the obtained RAW data is read out by the digital signal processor IC 32, the YUV conversion and the JPEG compression are conducted on the data, and the data are temporarily stored in the frame memory 15 as the JPEG file. The compression data in the frame memory 15 is read out via the digital signal processor IC 32, and stored in the data storing memory such as the memory card 20 (Step 20).

Figure 11:
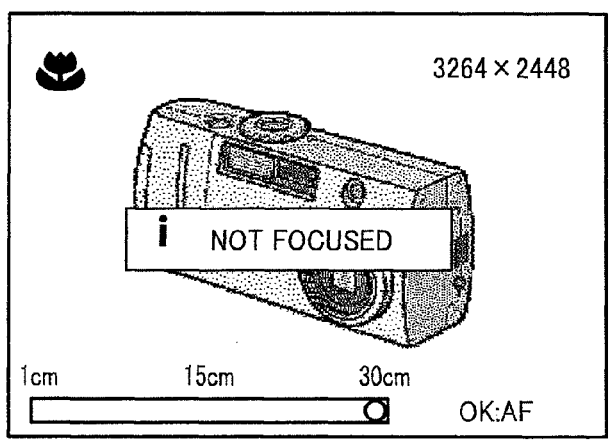
FIG. 11 is another example illustrating the display of the digital camera according to the first embodiment of the present invention.

FIG. 11 illustrates the display screen when the release button 201 or the right and left of the button 207 are pressed without conducting the AF operation prior to the photographing. In FIG. 11, the position of the focusing lens 1b is displayed by the circle mark "o". A warning that the focusing is not conducted is displayed on the center of the screen. In addition, this warning process is not described in the flow chart of FIG. 5.

Second Embodiment

Figure 12:
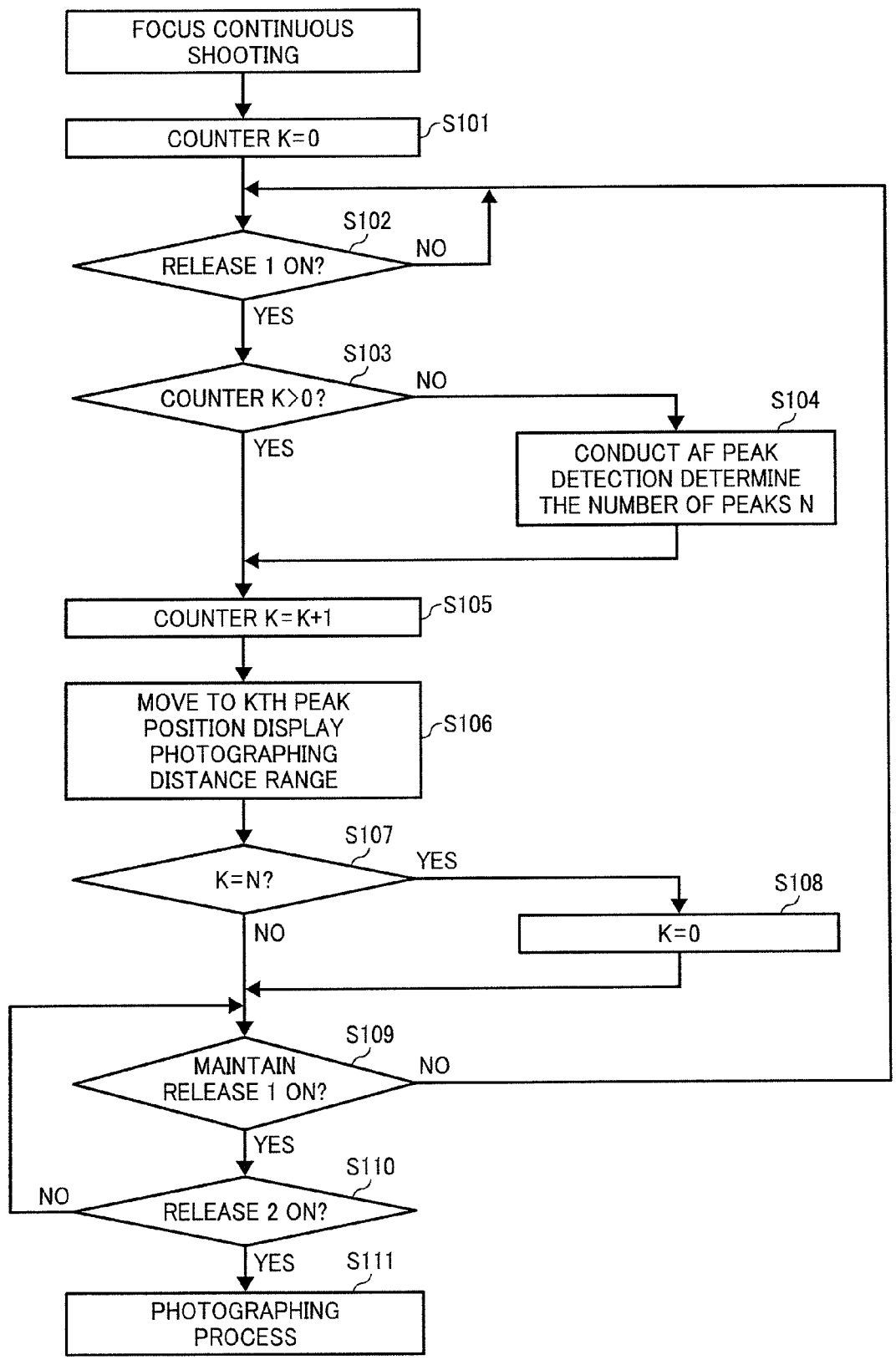
FIG. 12 is a flow chart illustrating the operation of a digital camera according to a second embodiment of the present invention.

Next, the second embodiment of a second method for selecting a photographing distance range in the focus bracketing mode which performs continuous shooting while moving a focused position will be described. FIG. 12 illustrates the flow chat describing the second selection method.

In this case, the release button 201 (FIGS. 2-4) of the operating section 18 (FIG. 1) is constituted as a two-stage operation release switch. The AF operation is conducted by the first-stage operation, i.e., the half-pressing (release 1), and the photographing process is conducted by the second-stage operation, i.e., the full-pressing (release 2).

Figure 13:
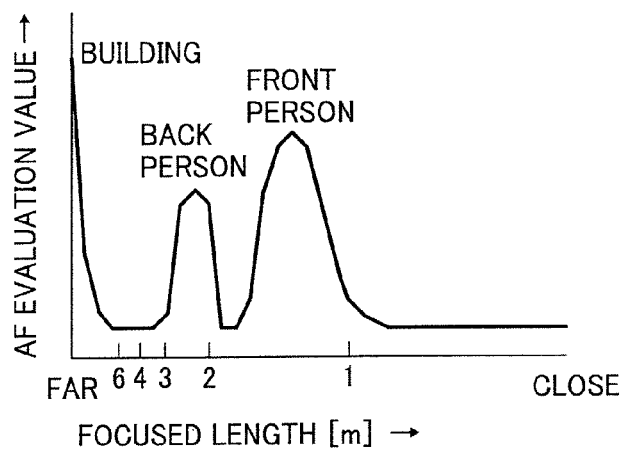
FIG. 13 is a graph illustrating the relationship between subject distances and AF evaluation values in the digital camera according to the second embodiment of the present invention.
Figure 14:
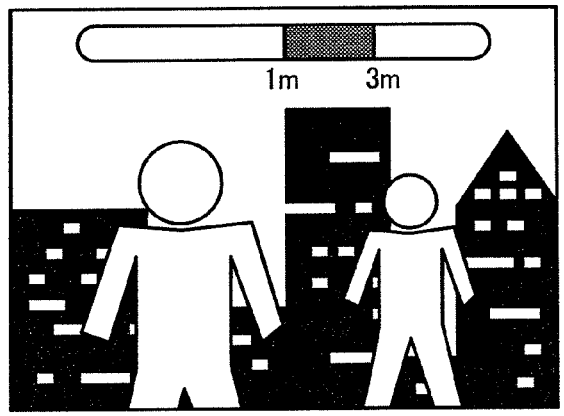
FIG. 14 is an example illustrating the display of the digital camera according to the second embodiment of the present invention.
Figure 15:
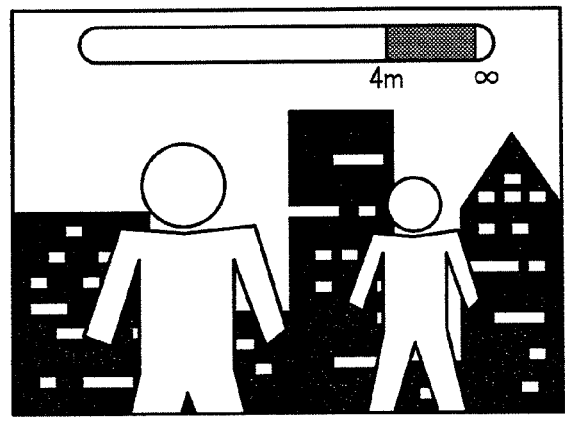
FIG. 15 is another example illustrating the display of the digital camera according to the second embodiment of the present invention.

FIG. 13 is one example of ranging results of subject distances by the AF operation, and illustrates on its horizontal axis focused distances of a lens and on its vertical axis AF evaluation values. The example in FIG. 13 is ranging results of subjects having a front person positioned at a distance from 1 in to 2 in, a back person positioned at a distance from 2 in to 3 m, and a far building as illustrated in FIGS. 14, 15.

When the focus bracketing mode is selected, the counter (variable) K is initialized to "0" (Step 101), waiting for the half-pressing of the release button 201, i.e., the turning on of the release 1 (Step 102). If the release button 201 is half-pressed at Step 102, and the release 1 is turned on, it is determined whether or not the counter K is larger than "0" (Step 103). If it is determined that the counter K is not larger than the "0", i.e., K=0 at Step 103, the ranging of the subject distance is conducted by the AF operation, the detection of the peak value of the AF evaluation values is conducted, and the peak number N is determined (Step 104).

After the peak number N is determined at Step 104, or if it is determined that the counter K is larger than "0" at Step 103, the counter K is incremented (K=K+1) (Step 105). The focusing lens 1b is moved to the position corresponding to the K-th peak position, and the photographing distance range is displayed (Step 106).

Next, it is determined whether or not the counter K has reached the peak number K (Step 107). If the counter K has reached (K=N) the peak number K, it is determined whether or not the half-pressing of the release button 201, i.e., the on state of the release 1 is maintained (Step 109) after returning the counter K to 0, or if the counter K is not reached, it is determined whether or not the half-pressing of the release button 201, i.e., the on state of the release 1 is maintained (Step 109) without changing the counter K.

At Step 109, if it is determined that the half-pressing of the release button 201, i.e., the on state of the release 1 is not maintained, the above processes are repeated after returning to Step 102. On the other hand, at Step 109, if it is determined that the half-pressing of the release button 201, i.e., the on state of the release 1 is maintained, it is determined that the full-pressing of the release button 201, i.e., the on state of the release 2 is determined (Step 110). If the release button 201 is full-pressed, and the release 2 is turned on, the photographing process of the focus continuous shooting corresponding to Steps 17 to 20 is conducted (Step 111). On the other hand, at Step 110, if the release button 201 is not full-pressed, and the release 2 is not turned on, the standby state is maintained till the release 2 is turned on after returning to Step 109.

Accordingly, in such a process, for example, the ranging results illustrated in FIG. 13 are obtained by the ranging of the AF operation just after the first half-pressing of the release button 201, and the screen displays that the photographing is conducted in the distance range of 1 m to 3 m having 2 persons in the photographing target range as illustrated in FIG. 14. The first displayed position is the peak position, but when two or more peak positions of the AF evaluation values are obtained, the peak position corresponding to the closest subject of the subjects is selected. In this state, if the release button 201 is full-pressed, the continuous shooting is conducted in the 8 points of the displayed range while moving the focusing lens 1b. As to the 8 times continuous shooting, the photographing is performed while moving a focused position similar to the focus bracketing process corresponding to Steps 17 to 20 in FIG. 5, and the image process and the storing are conducted after all image data is obtained.

In this case, if the displayed range does not meet the intention of a photographer, the release button 201 is once released, and the distance range of 4 m to infinity including the building, which is the next peak position of the AF evaluation values, in the focal point range is displayed as illustrated in FIG. 15, so that the building becomes the photographing target.

As described above, the peak position of the AF evaluation values is sequentially selected by the re-pressing operation of the half-pressing of the release button 201. If there is no next peak position (K=N) (corresponding to the first predetermined operation), the ranging of the subject distance is again conducted by the AF operation, and the range including the front peak position is displayed as the first photographing distance range as described above.

Figure 16:
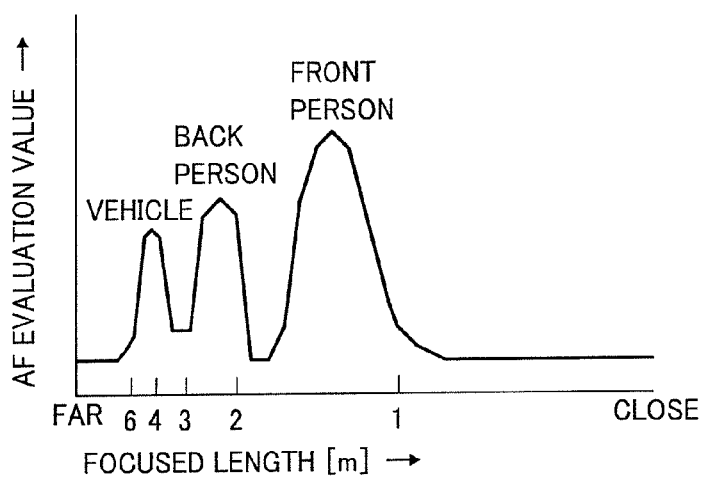
FIG. 16 is another graph illustrating the relationship between subject distances and AF evaluation values in the digital camera according to the second embodiment of the present invention.
Figure 17:
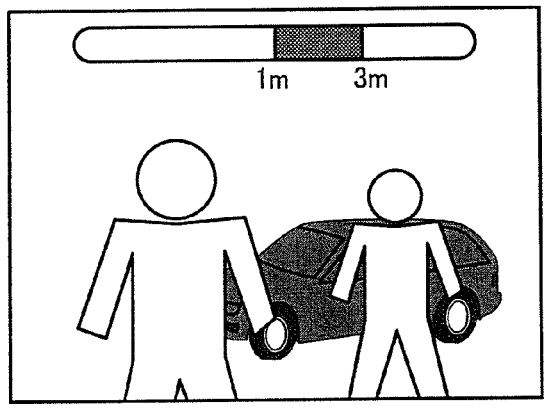
FIG. 17 is another example illustrating the display of the digital camera according to the second embodiment of the present invention.
Figure 18:
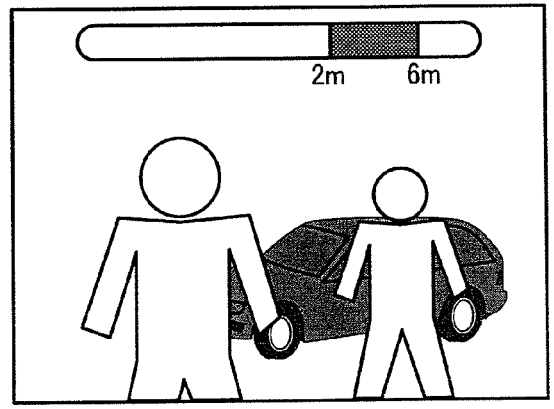
FIG. 18 is another example illustrating the display of the digital camera according to the second embodiment of the present invention.

FIGS. 16-18 illustrate an example describing subjects including three peak positions. In the ranging results of the subject distances illustrated in FIG. 16, the subjects of the front person, the back person, and the vehicle are detected around 1.5 m, 2.5 m, and 5 m, respectively. In this case, similar to the above-described operation, the photographing distance range of 1 m to 3 m is displayed (FIG. 17). If the release button 201 is once released, and the release button 201 is again half-pressed, the photographing distance range of 2 m to 4 m is displayed. Furthermore, if the release button 201 is again half-pressed, the photographing distance range (FIG. 18) around 2 m to 6 m is displayed.

In FIGS. 14, 15, 17, 18, only the photographing distance range which becomes the photographing target is displayed on the horizontal bar of the upper end of the screen. However, similar to FIGS. 7-10, the focused point of the focused position when conducting the AF operation before photographing can be displayed.

Third Embodiment

In the example using the above-described second selecting method, the peak position is sequentially selected by once releasing the half-pressed release button 201, and half-pressing the release button 201 again. If the release button 201 is half-pressed again after selecting all of the detected peak positions, the ranging of the subject distance by the AF operation is re-conducted. Hereinafter, the specific methods of the second selecting method will be described.

At first, a first method for selecting whether the ranging of the subject distance is re-conducted or it is moved to the detected next peak position will be described. This method performs the selecting according to a change in a subject state.

As described above, the digital camera described in the present embodiment generally includes a section for obtaining an AF evaluation value and a section for obtaining an RGB integration value which calculates an AE evaluation value and an AWB evaluation value. A frequency distribution on the screen can be obtained by using the obtained AF evaluation values, a luminance distribution on the screen can be obtained by using the obtained AE evaluation values, and a color distribution in the screen can be obtained by using the obtained AWB evaluation values. The frequency distribution, luminance distribution, and color distribution are obtained when the AF ranging is completed, so as to be stored in a memory.

Next, when the half-pressing of the release button 201 is re-conducted, the frequency distribution, the color distribution and the luminance distribution are re-obtained, so as to be compared with the frequency distribution, the color distribution and the luminance distribution stored in the memory. If the difference is within a predetermined range, it is determined that the subject state is unchanged and the ranging data when ranging the subject distance is effective, so that it is moved to the next peak position. In addition, when this difference exceeds the predetermined range, it is determined that the subject state is changed and the peak position is changed, so that the AF operation is conducted again regardless of the peak position at that time. In addition, a method similar to this method, which changes the operation such that the focusing operation is not re-conducted when the focused state is maintained, is disclosed in JP3934954B, for example.

In the above method, all information of the frequency distribution, the color distribution, and the luminance distribution is used. However, it can be determined whether or not the subject state is changed by any one of these distributions or the combination of two or more kinds of information.

Next, a second method for selecting whether the ranging of the subject distance is further re-conducted or it is moved to the detected next peak position will be described. This method is conducted according to elapsed times.

The CPU 13 measures the elapsed time after the AF operation. For example, if 10 seconds or more has passed, it increases a possibility that the subject is changed. It is determined that the reliability of the ranging results is decreased, and the AF operation is re-conducted regardless of the present peak position. Or, the release button 201 is half-pressed, and then the release button 201 in which the release 1 is turned on is once released, and the CPU 13 measures the elapsed time till the button is pressed again. When the elapsed time is a predetermined time (for example, 2 seconds) or more, the AF operation may be re-conducted.

In the above first embodiment, as illustrated in Table 1, the number of steps of the focused point is calculated from the focused range. The number of images photographed at one continuous shooting is the maximum photographable number from the size of the memory. However, the user can select these. In this case, items which can be selected by a user are a step range for moving a focused point and the number of images to be photographed by one continuous shooting (the number of focused points).

Figure 19:
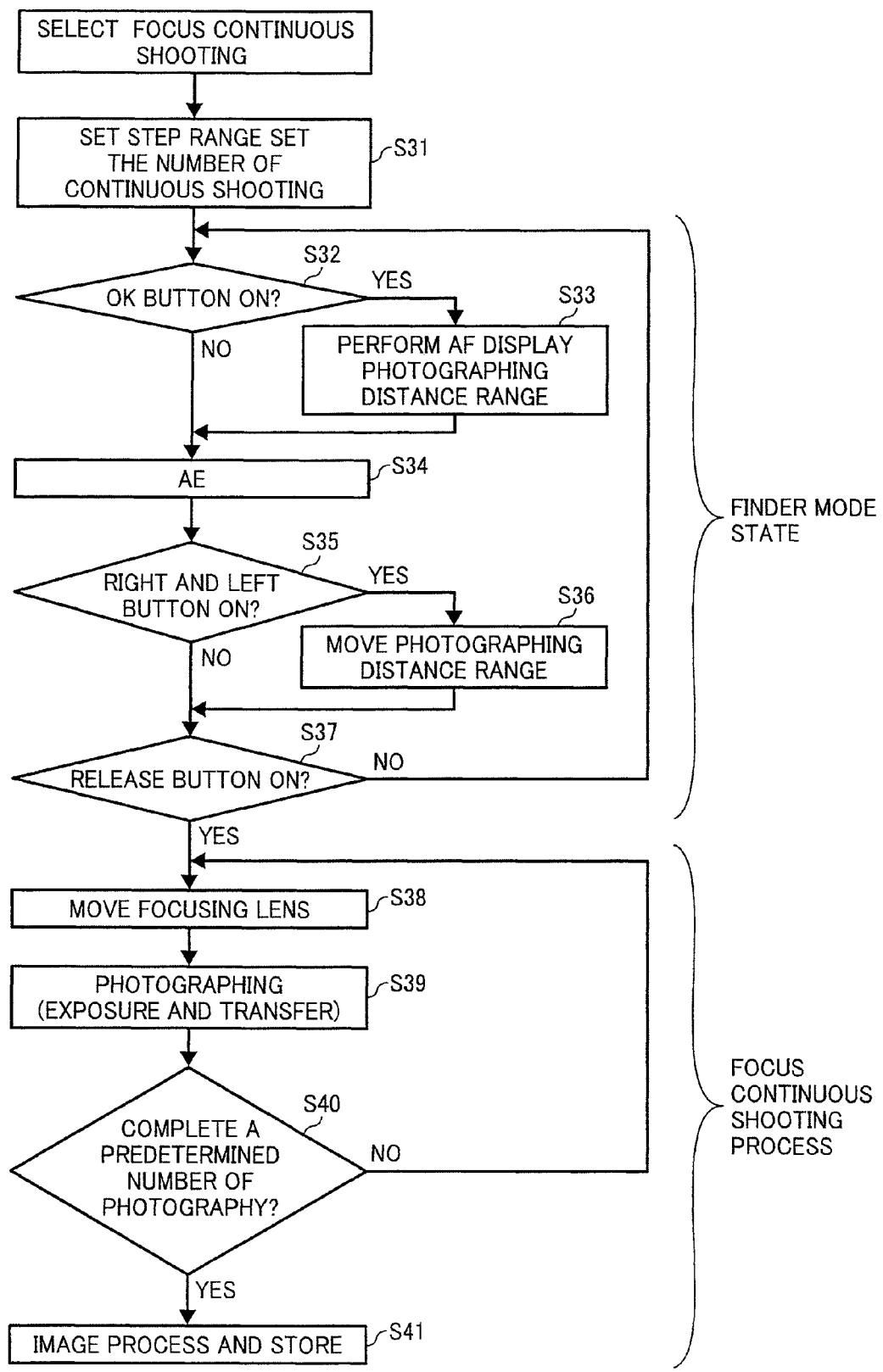
FIG. 19 is a flow chart illustrating the operation of a digital camera according to a third embodiment of the present invention.

Hereinafter, the digital camera according to the third embodiment of the present invention, which can select the number of images to be photographed by one continuous shooting and the step range for moving a focused point by a user, will be described with reference to the flow chart in FIG. 19.

In this case, in the focus bracketing mode, before pressing the OK button 208, the step range and the number of images by the continuous shooting are set (Step 31). If the OK button 208 is pressed in the finder mode (FIG. 6) (Step 32), the focused position is detected by the hill-climbing AF, and the photographing distance range is displayed (Step 33).

At Step 33, the AF operation is conducted, and the AE process is conducted in a state in which the photographing distance range is displayed. If the OK button 208 is not pressed at Step 32, the AE process is conducted (Step 34).

The right and left of the button 207 of the operating section 18 are pressed (Step 35), and the photographing distance range is moved (Step 36). In a state in which the photographing distance range is moved at Step 36, it is determined whether or not the release button 201 is pressed (Step 37). If the right and left of the button 207 are not pressed at Step 35, it is determined whether or not the release button 201 is pressed at Step 37. If it is determined that the release button 201 is not pressed, it is determined whether or not the OK button 208 is pressed after returning to Step 32.

If the photographing distance range is determined, the photographing is started by pressing the release button 201. If the CPU 13 detects that the release button 201 is pressed at Step 37, the focusing lens 1b is moved to the initial position of the photographing distance range of the continuous shooting (Step 38). For example, the focusing lens 1b is moved to the point of the front focused position in the photographing distance range. At this point, the subject is exposed by the exposure time determined at Step 13 of the finder mode, and all pixel data of 8 million pixels is transferred to the frame memory 15, so as to be stored in the frame memory 15 as the RAW data (Step 39).

After that, if the photographing of the set number of images is not completed (Step 40), the focusing lens 1b is moved to the next focused position according to the set step range after returning to Step 38, and the exposure and the transfer of the pixel data are re-conducted at Step 39. This operation is conducted in the photographing distance range (in this case, 8 points) till it is determined that the photographing of a predetermined number of images is completed at Step 40.

If all of the image data is obtained, the image process is started. The initially obtained RAW data is read out by the digital signal processor IC 32, the YUV conversion and the JPEG compression are conducted on the data, and the data are temporarily stored in the frame memory 15 as the JPEG file. The compression of the frame memory 15 is read out via the digital signal processor IC 32, and is stored in the data storing memory such as the memory card 20 (Step 41).

Figure 20:
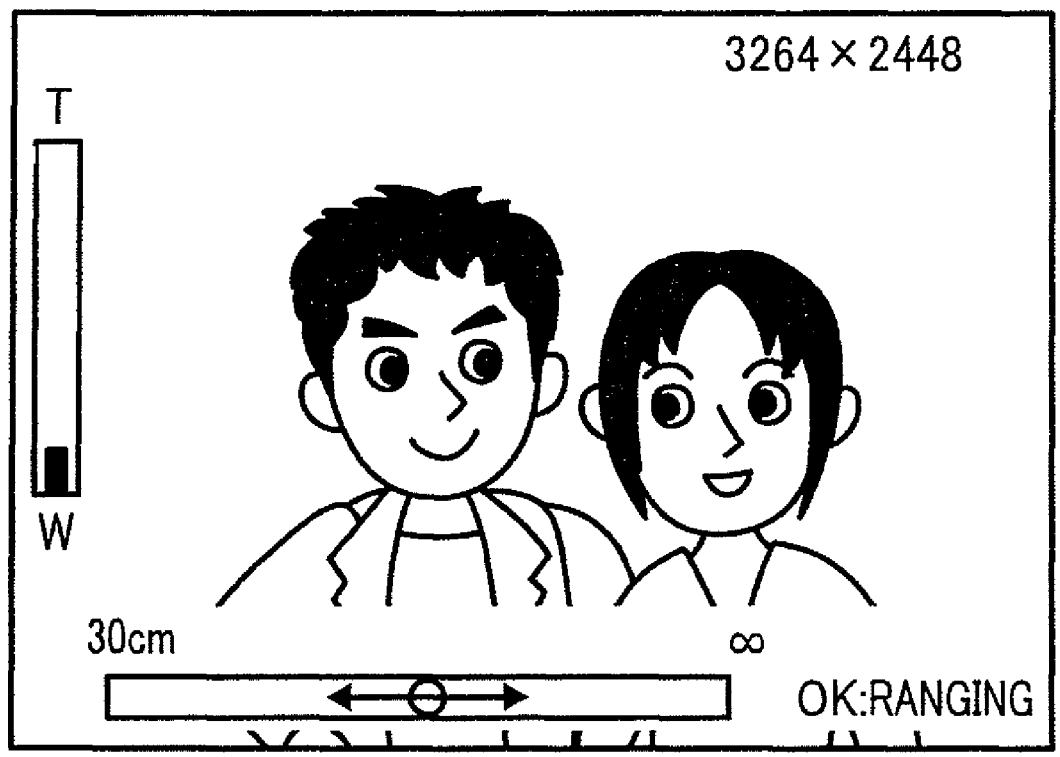
FIG. 20 is an example illustrating the display of the digital camera according to the third embodiment of the present invention.

FIG. 20 illustrates the screen display when the number of images to be photographed by one continuous shooting is reduced to half of FIG. 7 without changing the step range. In FIG. 20, the number of photographed pictures is reduced to half without changing the step range, so the range displayed as the photographing distance range after the AF operation is reduced to half of FIG. 7. If the number of images to be photographed by the continuous shooting is reduced, the photographing distance range is reduced. However, the number of images to be processed is reduced, so the processing time can be shortened, and also the time for waiting to the next photographing can be shortened.

If it is confirmed that the focusing is appropriately conducted on the screen by the display in FIG. 20, the number of images to be photographed is reduced according to needs. Accordingly, it is effective for increasing the processing speed, resulting in the decrease in power consumption. In addition, the capacity of the memory for use in the storage after photographing can be reduced, so the number of photographing times can be increased.

Even if the step range is reduced to half without changing the number of steps, the range similar to FIG. 20 can be obtained. The change in the step range enables the photographing in a further accurate focused position and may increase the possibility of obtaining an image of a desired focused state.

In the above embodiments, the initially obtained image is firstly stored in the data recording memory. However, the pixel data at the focused point (the point "o" on the horizontal bar) of the focused position in the previous AF operation can be initially stored in the data recording memory, and then the pixel data can be stored in order from the focused point close to that point of the initially stored data. In this case, since the image which is determined by the camera as focused is highly likely an image most in need, a required image can be easily obtained.

In the above embodiments, the continuous shooting data is stored in the frame memory as the RAW data, and the image processing is conducted after obtaining the continuous shooting images, but the image process can be started while obtaining the continuous shooting images. If the operation of the digital signal processor IC 32 is very fast, for example, and if the image process till the JPEG compression of the image in the previous focused point is completed in the exposure time, the memory required for storing one image is only about 2 MB, so the number of images to be photographed can be further increased.

Fourth Embodiment

Hereinafter, a fourth embodiment of the present invention will be described.

As an autofocusing method, an active method using an infrared illumination LED, a passive method using an optical lens and an integral phase difference sensor, and a TTL-AF method, which guides the light after passing through a photographing lens to a phase difference sensor, are known.

The autofocusing system for use in a recent compact digital camera is generally a contrast system which is a known technique as a conventional autofocusing technique for use in a video camera.

The operation principle of the contrast system is to photograph a subject while changing the position of a focusing lens by a minimum step, extract a high frequency component of each photographing data (high frequency component of Fourier coefficient when conducting Fourier conversion to image data), and calculate as an AF evaluation value (integration value (average value) of, high frequency component of Fourier coefficient) according to the high frequency component, so as to obtain the focused position in which the AF evaluation value becomes the maximum value.

The most common operation method of this system is to sequentially photograph while moving the focusing lens at a minimum step (minimum step driving) prior to actual photographing, extract the high frequency component of the photographing data, and calculate the AF evaluation value.

Next, the focused position that an AF evaluation value becomes the maximum value is selected as the focused position, this position is stored, and the focusing lens is again moved to that position when completing the minimum step driving operation, so as to conduct the actual photographing.

By this operation, an accurate focused position is obtained without providing an additional sensor, although it takes time to determine the focused position.

Figure 21A:
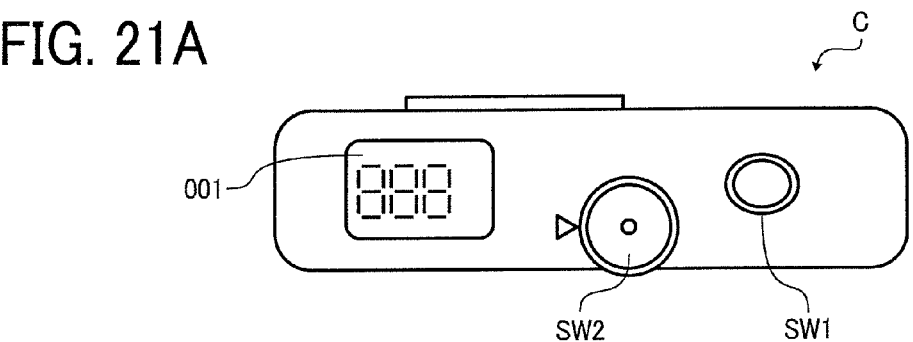
FIG. 21A is a plan view illustrating a digital camera according to a fourth embodiment of the present invention.
Figure 21B:
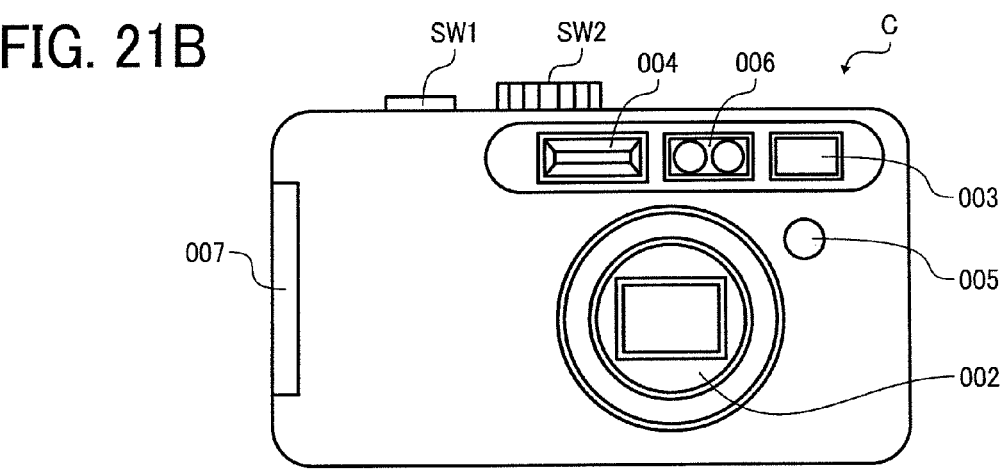
FIG. 21B is a front view illustrating the digital camera according to the fourth embodiment of the present invention.
Figure 21C:
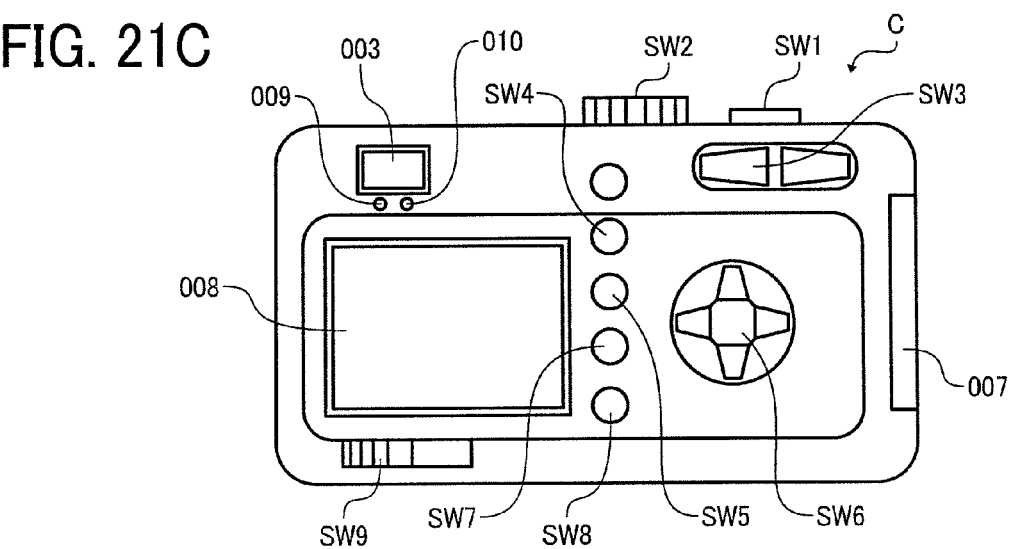
FIG. 21C is a back view illustrating the digital camera according to the fourth embodiment of the present invention.

FIGS. 21A, 21B, 21C are external views each illustrating a digital camera according to the present embodiment. FIG. 21A is a plan view, FIG. 21B is a front view, and FIG. 21C is a back view.

As illustrated in FIG. 21A, the top part of the digital camera is provided with a sub-LED display 001, a release button SW1, and a mode dial SW2.

If the release button SW1 is half-pressed, the focusing is locked, and if the release button SW1 is full-pressed, the actual photographing is conducted.

As illustrated in FIG. 21B, the front face of the digital camera includes a lens barrel unit 002 having a photographing lens, a light entrance section of an optical finder 003, a strobe light-emitting section 004, a remote control light receiver 005, and an infrared light ranging unit 006. The side part of the digital camera is provided with a lid 007 of a memory card/battery loading room.

As illustrated in FIG. 21C, the digital camera includes on the back face thereof an eye piece section of the optical finder 003, an LCD display 008, an AF confirmation LED 009, a strobe confirmation LED 010, a zoom button SW3, a self-timer button SW4, a menu button SW5, a cursor movement setting button SW6, a display button SW7, an OK button SW8, and a power source button SW9.

In the digital camera according to the present embodiment, the operating section S is constituted by the SW1 to SW9.

Figure 22:
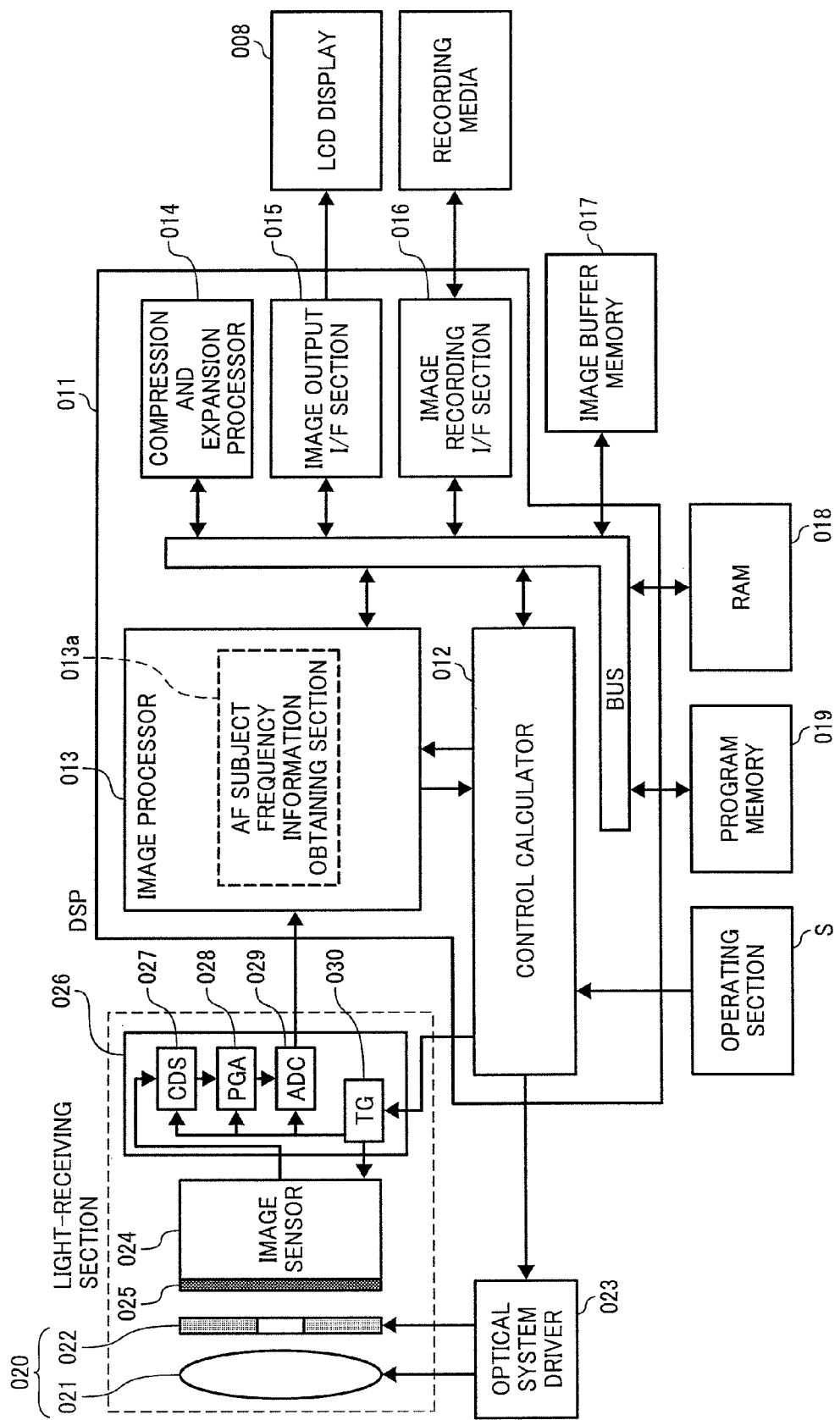
FIG. 22 is a block diagram illustrating the system structure of a digital camera according to fourth to sixth embodiments of the present invention.

FIG. 22 is a block diagram illustrating the system structure of the present embodiment.

In FIG. 22, reference number 011 denotes a digital signal processor IC. This digital signal processor IC 011 houses a control calculator (CPU section) 012, an image processor 013, a compression and expansion processor 014, an image output I/F section 015, and an image recording I/F section 016. These sections are connected to each other via a bus line BUS.

The image processor 013 includes various image processing functions, and also includes an AF subject frequency information obtaining section 013a which obtains an AF evaluation value according to the frequency information of the subject image by the above-described contrast system.

The external part of the digital signal processor IC 011 is provided with an image buffer memory 017, a RAM 018, and a program memory 019 in which a control program and a parameter are stored. These are connected to the digital signal processor IC 011 via the bus line BUS.

Each section of the digital camera is controlled by the control calculator 012 of the digital signal processor IC 011.

The image buffer memory 017 stores the RAW-ROB image data (image data in which white balance is corrected and γ correction is conducted) converted from the image data of the photographed image, the YUV image data (image data converted into brightness data and color difference data), and the JPEG image data (image data compressed by JPEG compression).

When the power source button SW9 is turned on, the control program stored in the program memory 019 is loaded into the memory of the digital signal processor IC 011. Each section of the digital camera is controlled by this control program.

When the control program is executed, the memory of the RAM 018 is used as the working memory of the control program. Accordingly, the control data, the parameter and the like of the control program are written in the memory of the ROM 018, and also read out from the ROM 018.

The after-described process is performed by the control calculator 012 of the digital signal processor IC 011 according to the control program.

In FIG. 22, reference number 020 is a photographing optical system which images a subject image. The photographing optical system 020 includes a photographing lens 021 having a zooming lens and a focusing lens, and an aperture stop and shutter unit 022 having an aperture stop and a mechanical shutter.

The photographing lens 021, the aperture stop and shutter unit 022 are driven by an optical system driver 023. The optical system driver 023 is controlled by the control calculator 012 of the digital signal processor IC 011.

In the photographing optical system 020, the positions of the zoom lens and the focusing lens are changed by the mechanical mechanism in focusing, zooming, activating and stopping. The aperture stop and shutter unit 022 is adjusted so as to obtain appropriate exposure in photographing, and the opening and closing operation of the shutter is conducted when photographing a still image.

In the operation of the digital camera, a subject image is focused on the light-receiving section of the image sensor 024 by driving the focusing lens with the optical system driver 023.

An optical low-pass filter 025 which prevents the entrance of ultraviolet is provided on the incidence side of the light-receiving section of the image sensor 024.

As the image sensor 024, a CCD type can be used, but in this embodiment, a CMOS image sensor, which can read out picture signals faster than the CCD image sensor, is used.

The subject image focused on the light-receiving section of the image sensor 024 by the photographing optical system 020 built in the lens barrel unit 002 is converted into image signals by the image sensor 024. The image signals are output to an FEP (front-end processor) 026.

The FEP 026 includes a CDS 027 which conducts correlation double sampling, a PGA 028 which automatically adjusts gain, and an ADC 029 which converts analogue image signals output from the PGA 028 into digital image signals.

The FEP 026 conducts predetermined processes such as a noise reduction process and a gain adjusting process on the analogue image signals output from the image sensor 024, converts the analogue image signals into the digital image signals, and outputs the signals to the image processor 013 of the digital signal processor IC 011.

The timing process such as the sampling of image signals by the PEP 026 is performed by a timing generator TG 030 according to VD/HD signals which are fed back from the image processor 013 of the digital signal processor IC 011.

The control calculator 012 of the digital signal processor IC 011 is connected with each section of the digital camera such as a strobe circuit which flashes the strobe light-emitting section 004. These are controlled and observed by the control calculator 012.

The sub-LCD 1 via the LCD driver, the remote control light receiver 005, the AF confirmation LED 009, the strobe confirmation LED 010, the operating section S having the buttons SW1 to SW9, a buzzer (not shown), and the like are connected to the control calculator 012. These are also controlled by the control calculator 012.

The control calculator 012 constantly observes the input state of the signals to the remote control light receiver 005 and the input state to the operating section S.

The image output I/F section 15 of the digital signal processor IC 011 is connected with the LCD display 008 via the LCD driver which drives the LCD display 008.

The LCD display 008 is used to display a subject in photographing and a photographed image, and an image recorded in the memory card or the internal memory, and the like.

The image recording I/F section 016 is connected with a memory card slot (not shown), and exchanges image data between a recording medium such as an additional memory card inserted into the memory card slot and the digital camera.

Next, the basic operation of the digital camera according to the present embodiment will be described.

The operation mode of the digital camera includes a photographing mode which is used when photographing and a reproduction mode which is used when reproducing a photographed image. The operation of the photographing mode includes the after-described AF area confirmation mode and the AF area selection mode.

In addition, the operation of the photographing mode includes various operation modes such as a self-timer mode which photographs by using a self-timer and a remote control mode which remotely controls the digital camera by a remote controller.

Figure 23:
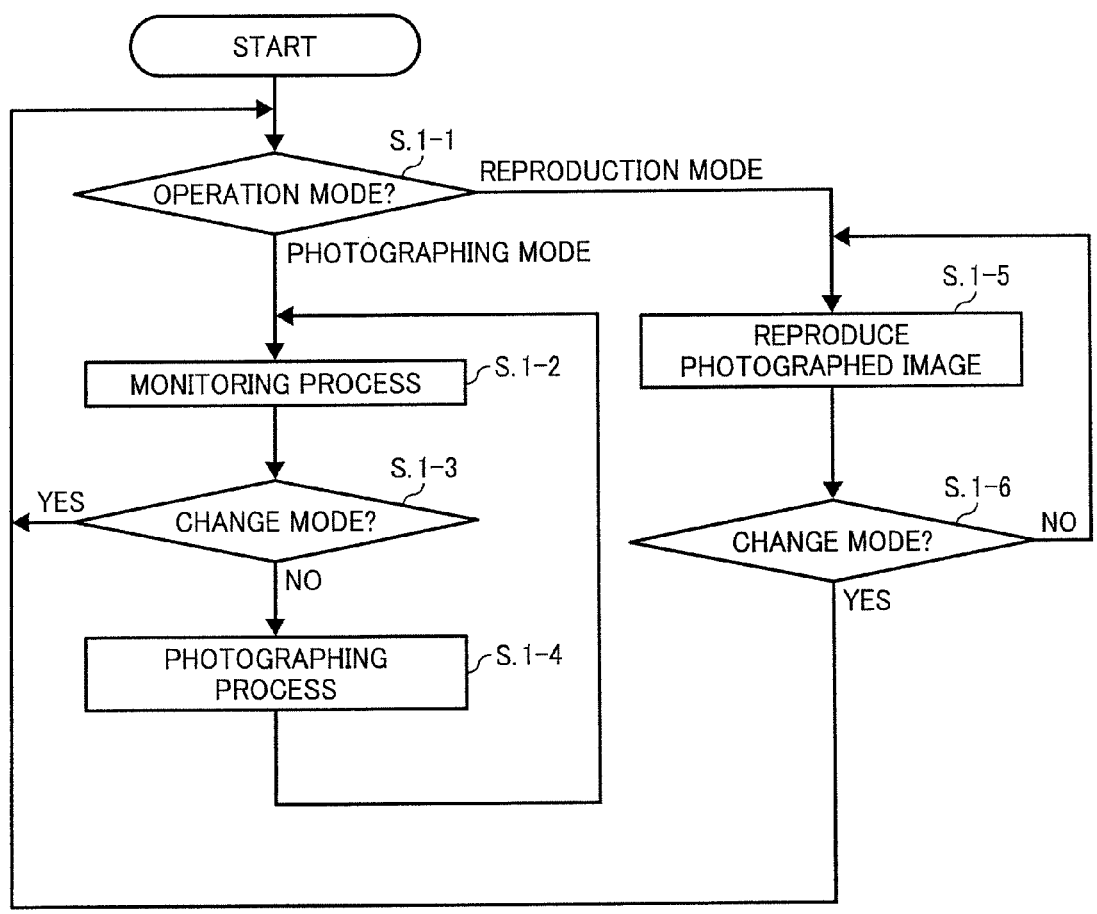
FIG. 23 is a flow chart illustrating the general operation of the digital camera according to the fourth to sixth embodiments of the present invention.

FIG. 23 is a flow chart describing a general operation of the digital camera according to the present embodiment.

If the power source button SW9 of the digital camera is turned on, the processes illustrated in the flowchart in FIG. 23 are started. Hereinafter, these processes are described according to FIG. 23.

In the on state of the power source button SW9 of the digital camera, if the mode dial SW2 is set to the photographing mode, the digital camera is set to the photographing mode. If the mode dial SW2 is set to the reproduction mode, the digital camera is set to the reproduction mode.

At Step 1-1, it is determined whether the state of the mode dial SW2 is the photographing mode or the reproduction mode. If the state of the mode dial SW2 is the photographing mode, the process goes on to Step 1-2. On the other hand, if the state of the mode dial SW2 is the reproduction mode, the process goes on to Step 1-5.

At Step 1-2, the optical system driver 023 is controlled by the control calculator 012 of the digital signal processor IC 11, and the lens barrel constituting the lens barrel unit 002 is moved to a photographable position. Each of the circuits required for photographing such as the image sensor 024, the FEP 026, and the LCD display 008 is turned on.

The information of then subject image focused on the light-receiving section of the image sensor 024 by the photographing optical system 020 is constantly converted into the RGB analogue signals by the image sensors 024. After predetermined processes such as the noise reduction process and the gain adjustment process are conducted by the CDS 027 and the PGA 028, the RGB analogue signals are converted into the ROB digital signals from the RGB analogue signals, and output to the image processor 013 of the digital signal processor IC 011.

Moreover, the ROB digital signals are converted into the RAW-RGB image data, the YUV image data, and the JPEG image data by the image processor 013, and are written into the frame memory of the image buffer memory 017 by the memory controller (not shown).

The YUV image data are constantly read out from the frame memory of the image buffer memory 017, converted into the video signals by the image output VP section 015, and output to the LCD display 008.

As described above, in the photographing standby state, the image data of the subject image is constantly loaded into the frame memory of the image buffer memory 017, and the process for outputting the subject image to the LCD display 008 is conducted. This process at Step 1-2 is called a monitoring process.

At Step 1-3, it is determined whether or not the setting of the mode dial SW2 is changed. When the setting of the mode dial SW2 is changed, the process goes back to Step 1-1. On the other hand, when the setting of the mode dial SW2 is changed, the process goes on to Step 1-4.

At Step 1-4, the state of the release button SW1 is determined. If the release button SW1 is not pressed, the process goes back to Step 1-2. If the release button SW1 is half-pressed, the AF area confirmation mode process or the AF area selection mode process is conducted. If the release button SW1 is full-pressed, the focus bracketing photographing is conducted within the set photographing distance range.

The photographed image is loaded into the frame memory of the image buffer memory 017, and the process which records the image data into the recording medium is conducted. After that, the process goes back to Step 1-2. This process at Step 1-4 is called the photographing process.

As described above, if the digital camera is operated in the photographing mode, the processes from Step 1-2 to Step 1-4 are repeated. The repeated processes are called the finder mode. In the digital camera according to the present embodiment, these processes are repeated at a predetermined frequency.

In this finder mode, the monitoring process which displays a subject on the LCD display 008 is repeated at a predetermined frequency, so the display of the LCD display 008 is updated according to this process.

In addition, at Step 1-5, the image data recorded in the recording medium such as the internal memory and the memory card is output to the LCD display 008, and the process goes on to Step 1-6.

At Step 1-6, it is determined whether or not the setting of the mode dial SW2 is changed. If the setting of the mode dial SW2 is changed, the process goes back to Step 1-1. On the other hand, if the setting of the mode dial SW2 is not changed, the process goes back to Step 1-5.

Figure 25A:
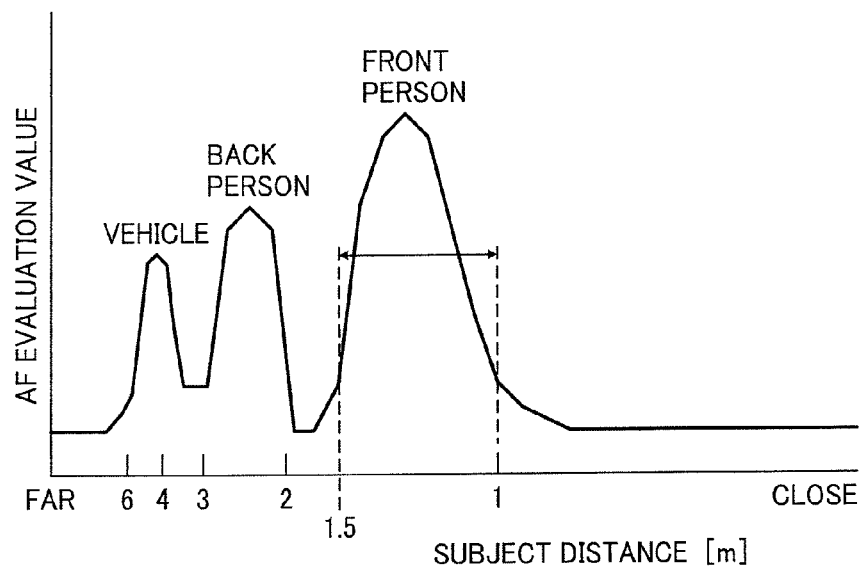
FIG. 25A is a graph illustrating the relationship between subject distances and AF evaluation values in the photographing distance range confirmation mode of the digital camera according to the fourth embodiment of the present invention.
Figure 25B:
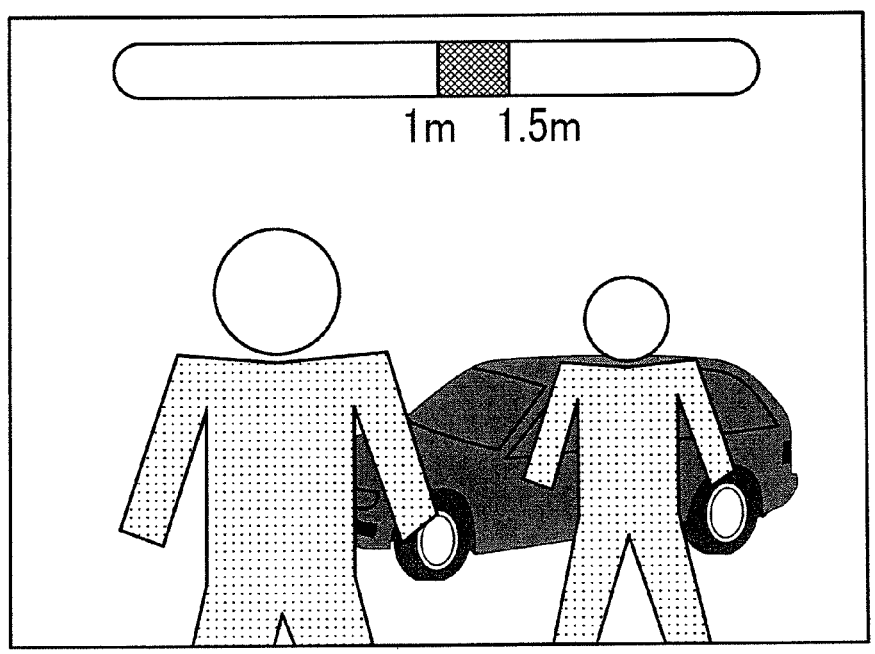
FIG. 25B is an example illustrating the display in the photographing distance range confirmation mode of the digital camera according to the fourth embodiment of the present invention.

As illustrated in FIG. 25B, in the AF area confirmation mode in the present embodiment, the photographing distance range in the focus bracketing photographing is displayed on the LCD display 008 before starting the focus bracketing photographing, so as to conduct the focus bracketing photographing after a photographer confirms the photographing distance range.

The digital camera according to the present embodiment includes a photographing distance range setting section which sets a photographing distance range capable of focusing on a subject from the data near the maximum value of the AF evaluation value relative to each focused position. When the release button SW1 is half-pressed in photographing, the photographing distance range is displayed on the LCD display 008. When the release button SW1 is full-pressed, the focus bracketing photographing is conducted in the displayed photographing distance range, and each photographed image is recorded.

Figure 24:
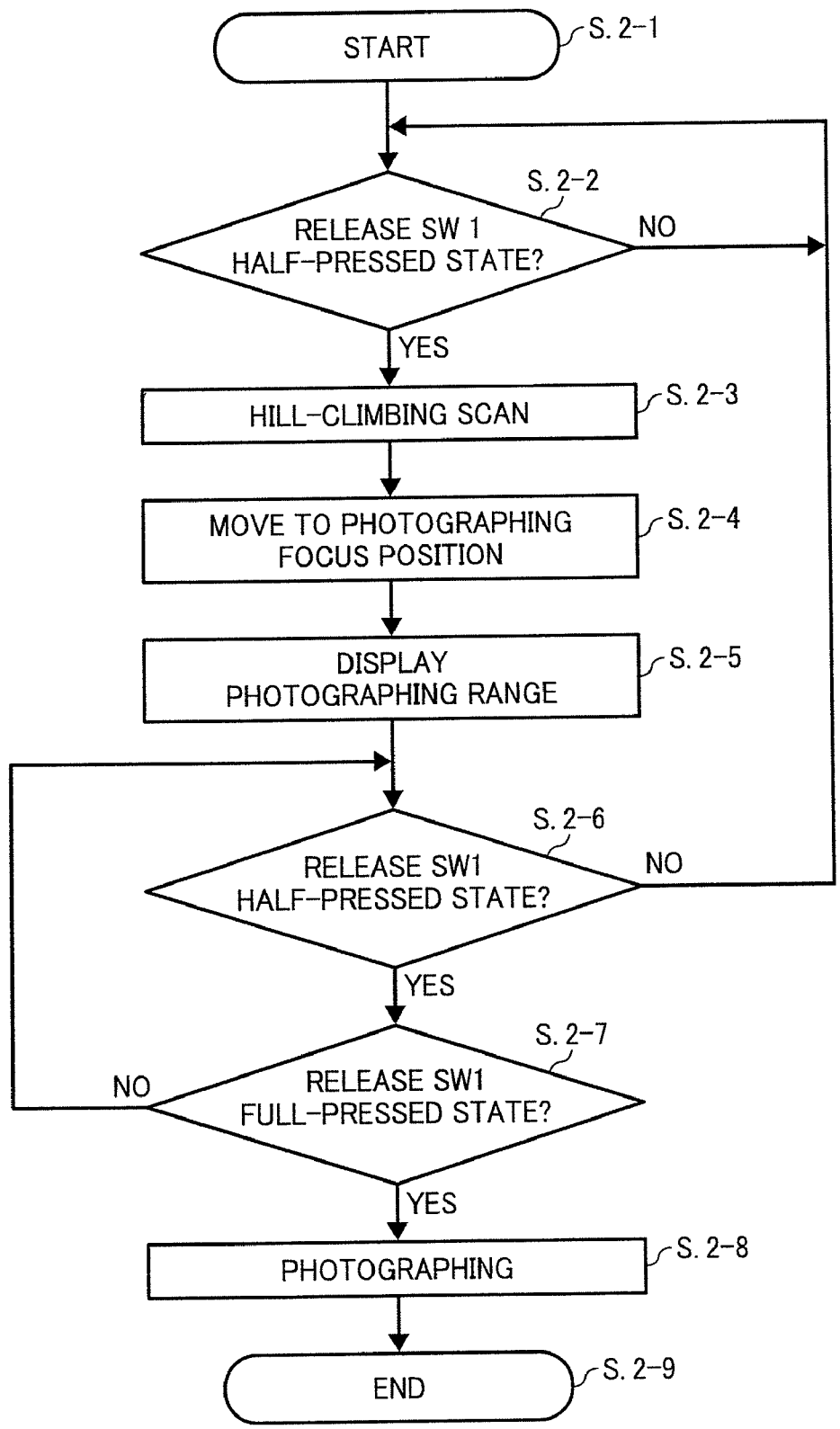
FIG. 24 is a flow chart describing a photographing distance range confirmation mode of the digital camera according to the fourth embodiment of the present invention.

FIG. 24 is a flow chart illustrating the photographing process in the photographing distance range confirmation mode.

At Step 2-1, the process of the photographing distance range confirmation mode is started.

At Step 2-2, it is determined whether or not the release button SW1 is half-pressed. If the release button SW1 is not half-pressed, the process goes back to Step 2-2. On the other hand, if the release button SW1 is half-pressed, the process goes on to Step 2-3.

At Step 203, the control calculator 012 conducts the hill-climbing scanning process while shifting the focused position of the focusing lens of the photographing optical system 020.

More particularly, the control calculator 012 records image information while moving the focal lens from the focused position of the closest distance to the focused position in infinity, and also calculates the AF evaluation values according to the frequency information of the subject image by the AF subject frequency information obtaining section 013*a*.

In the general autofocusing process, a plurality of peaks of the AF evaluation values is obtained because of a plurality of subject distances capable of focusing on the subject, so the focused position of the subject having the maximum peak value of the AF evaluation values is used as the focused position by referring to the subject in the center of the image or the subject positioned at the close distance in the entire image.

In the present embodiment, the focused position of the subject (the front person in FIG. 25A) in which the peak value is the maximum is used as the focused position.

At Step 2-4, the photographing distance range of the focus lens is set according to the AF evaluation values calculated and recorded in Step 2-3, and the focusing lens is moved to the lens position of the photographing distance range.

In addition, the photographing distance range is previously set by a photographer or can be automatically set according to the information such as the state of the aperture stop and shutter unit 022, the state of the photographing lens 21, and the exposure state.

In the present embodiment, the photographing distance range setting section, which automatically determines the photographing distance range according to the peak graph (refer to FIG. 25A) of the AF evaluation values, is provided. More particularly, the graph width such as a half width of the peak graph is used.

At Step 2-5, the photographing distance range is displayed on the LCD display 008 by the photographing distance range display section which displays the photographing distance range of the focus bracketing photographing on the LCD display 008.

The photographing distance range display section displays the photographing distance range on the LCD display 008 by the program process.

At Step 2-6, it is determined whether or not the half-pressing of the release button SW1 is maintained. If the half-pressing of the release button SW1 is not maintained, the process goes back to Step 2-2. On the other hand, if the half-pressing of the release button SW1 is maintained, the photographing standby state of the digital camera is maintained, and the process goes on to Step 2-7.

At Step 2-7, it is determined whether or not the release button SW 1 is full-pressed. If the release button SW1 is not full-pressed, the process returns to Step 2-6. On the other hand, if the release button SW1 is full-pressed, the process goes on to Step S. 2-8.

At Step 2-8, the photographing is conducted a predetermined number of times or at predetermined focused position intervals while moving the focusing lens in the photographing distance range determined at Step 2-4.

At Step 2-9, the process is completed.

By the above-described structure, when the release button SW1 is half-pressed, a photographer can confirm the photographing distance range by displaying on the LCD display 008 the photographing distance range when conducting the focus bracketing photographing. Accordingly, the photographing can be conducted after confirming whether or not the subject is approximately in the photographing distance range, so that the photographing error can be reduced, and also the subject image intended by the photographer can be obtained.

In addition, by displaying the photographing distance range and conducting the focus bracketing photographing operation with the two-stage release button SW1, the first switching operation can be conducted in conjunction with the second switching operation by a single release button SW1. Therefore, the operation performance can be improved.

In this case, if the subject intended by a photographer is not located in the photographing distance range displayed by the half-pressing of the release button SW1, the digital camera is set to the initial state by releasing the half-pressing of the release button SW1, and then, the hill-climbing scanning process can be re-performed by half-pressing the release button SW1 again. Thereby, the focusing can be conducted till the subject intended by a photographer is located in the displayed photographing distance range.

Fifth Embodiment

Hereinafter, a fifth embodiment of the present invention will be described. In addition, the description will be omitted for the same or similar parts as those in the fourth embodiment, and the same reference numbers are attached to the same or similar parts as those in the fourth embodiment.

The digital camera according to the present embodiment includes a photographing distance range setting section, which sets a plurality of photographing distance ranges capable of focusing on a subject from the data near the maximum value of the AF, evaluation values relative to each focused position. Every time the half-pressing of the release button SW1 is conducted in the photographing, a plurality of photographing distance ranges is sequentially displayed. When the release button SW1 is full-pressed, the AF bracketing photographing is conducted in the displayed photographing distance range, and the each of the photographed images is recorded.

Figure 27A:
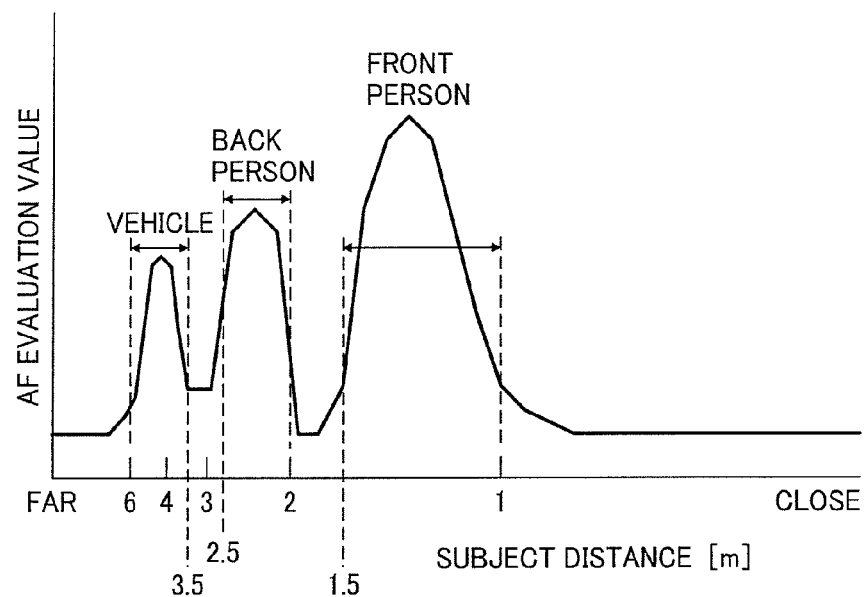
FIG. 27A is a graph illustrating the relationship between subject distances and AF evaluation values in the photographing distance range selection mode of the digital camera according to the fifth embodiment of the present invention.
Figure 27B:
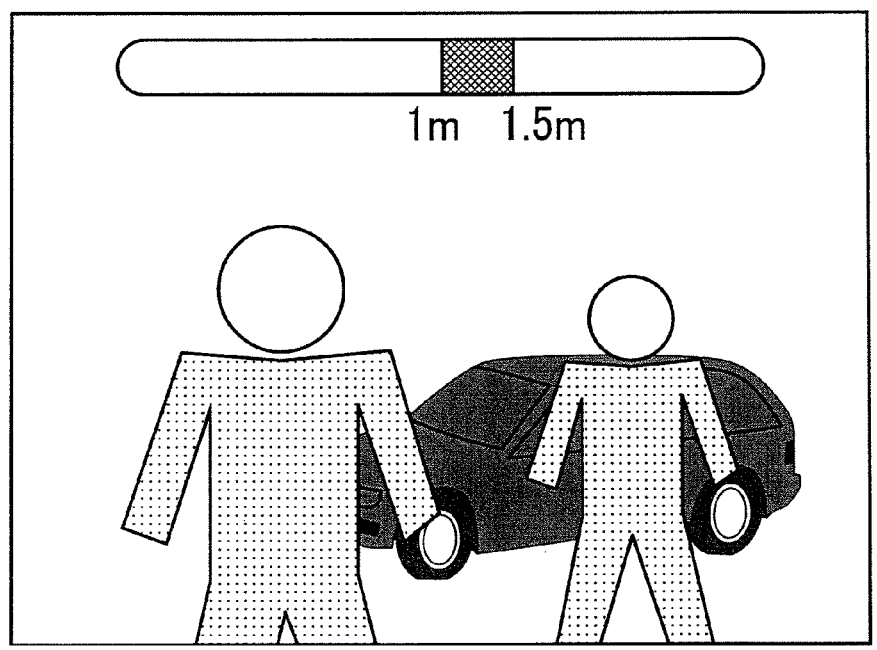
FIG. 27B is an example illustrating the display in the photographing distance range confirmation mode of the digital camera according to the fifth embodiment of the present invention.

As illustrated in FIGS. 27B-271, in the AF area selection mode according to the present embodiment, the photographing distance range in the focus bracketing photographing is displayed on the LCD display 008 before starting the focus bracketing photographing, and the focus bracketing photographing can be conducted after a photographer confirms the photographing distance range.

Figure 27C:
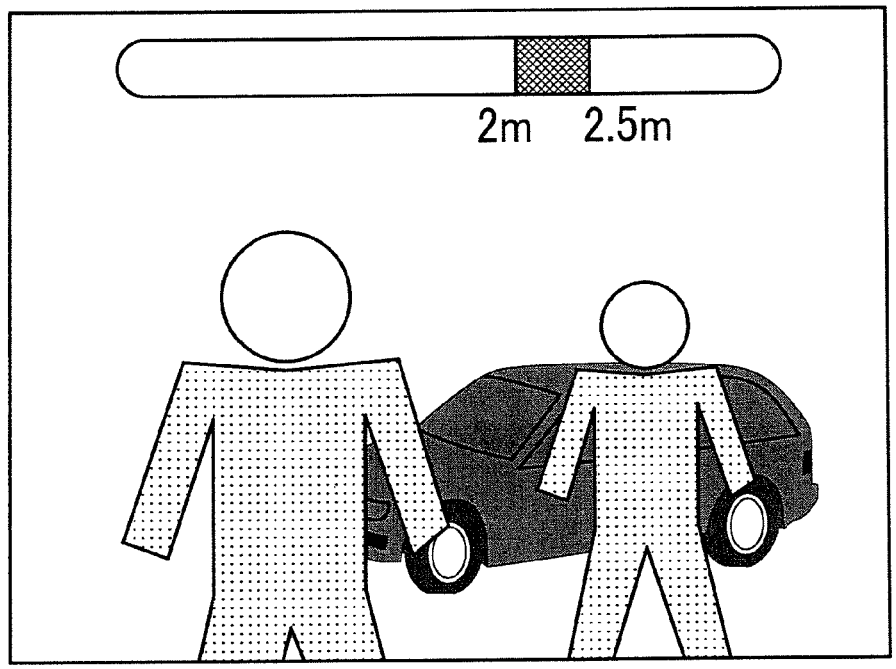
FIG. 27C is another example illustrating the display in the photographing distance range confirmation mode of the digital camera according to the fifth embodiment of the present invention.
Figure 27D:
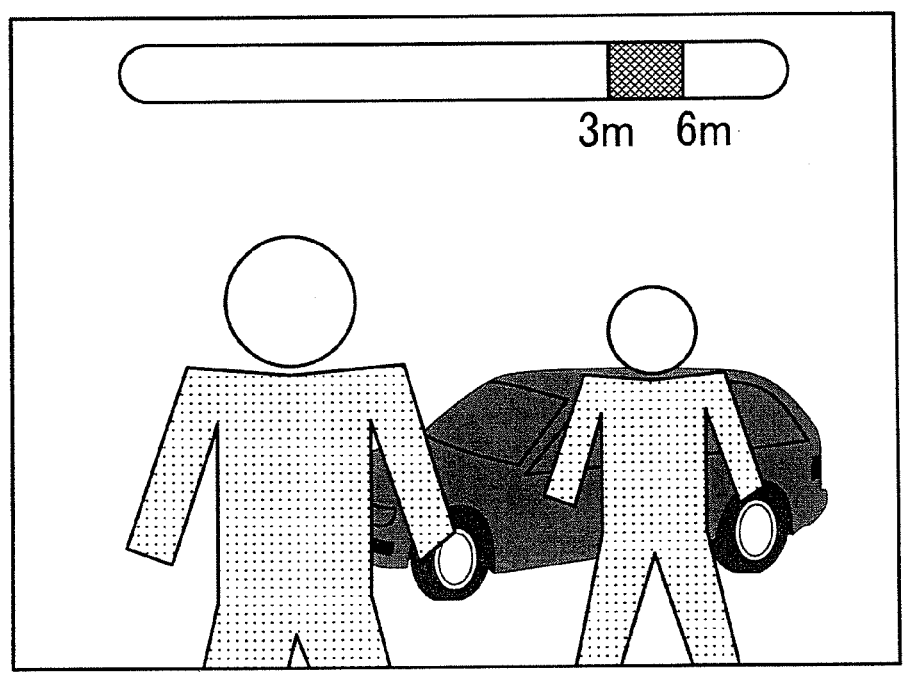
FIG. 27D is another example illustrating the display in the photographing distance range confirmation mode of the digital camera according to the fifth embodiment of the present invention.

In the present embodiment, if the display of the photographing distance range in which the focus bracketing photographing is conducted does not meet a photographer's intent when the half-pressing operation of the release button SW1 is conducted for the first time, the photographing distance range is sequentially changed to switch the display (FIG. 27B→FIG. 27C→FIG. 27D) every time the half-pressing operation of the release button SW1 is conducted by repeating the half-pressing operation of the release button SW1. The photographer repeats this operation until the photographer's intent is met. If the photographing distance range which meets the photographer's intent is selected, the focus bracketing photographing is conducted by full-pressing the release button SW1.

Figure 26:
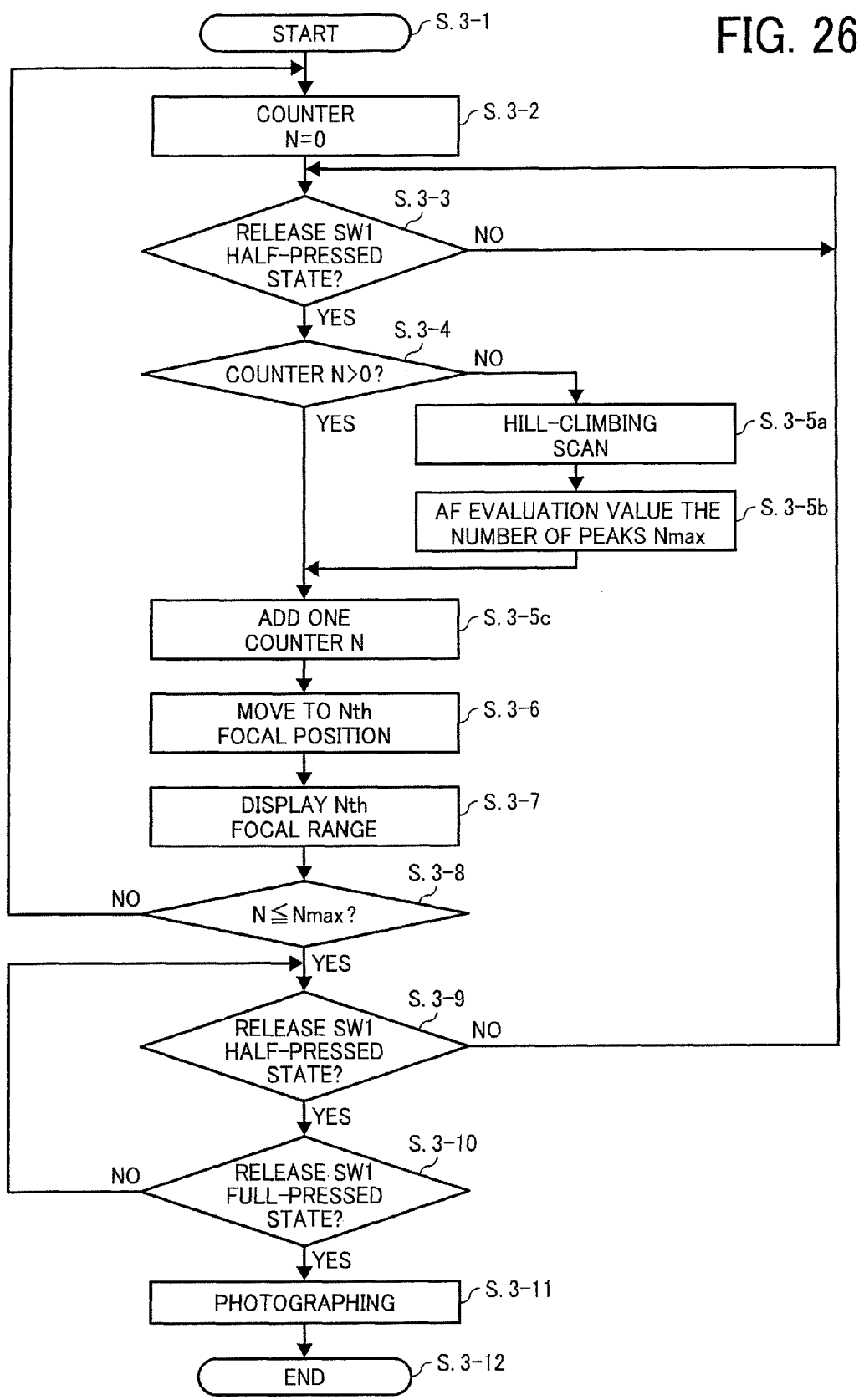
FIG. 26 is a flow chart describing a photographing distance range selection mode of the digital camera according to the fifth embodiment of the present invention.

FIG. 26 is a flow chart illustrating the photographing distance range selection mode.

At Step 3-1, the process of the photographing distance range selection mode is started.

At Step 3-2, the counter N is set to the initial value 0.

At Step 3-3, it is determined whether or not the release button SW3 is half-pressed. If the release button SW 1 is not half-pressed, the process returns to Step 3-3. On the other hand, if the release button SW is half-pressed, the process goes on to Step 3-4.

At Step 3-4, it is determined whether or not the value of the counter N is N>0. If the value of the counter N is not N>0 (in this case, N=0), the process goes on to Step 3-5a. On the other hand, if the value of the counter N is N>0, the process goes on to Step 3-5c.

At Step 3-5a, the control calculator 012 performs the hill-climbing process while shifting the focused position of the focusing lens of the photographing optical system 020.

More particularly, the control calculator 012 records the image information and also calculates the AF evaluation values according to the frequency information of the subject image by an AF subject frequency information obtaining section 13a while moving the focusing lens from the focused position of the closest distance to the focused position in infinity.

In the present embodiment, since a plurality of subject distances capable focusing on a subject is obtained, a plurality of AF evaluation values is obtained. However, in the present embodiment, all of the focused positions of the subjects in which the peak values exceed a predetermined threshold in the AF evaluation values are used as the focused positions.

The process goes on to the next Step 3-5b.

At Step 3-5b, the control calculator 012 sets the number of peaks in which the peak value exceeds the predetermined threshold in the peaks of the AF evaluation values calculated at Step 3-5a to Nmax. After that, the process goes on to Step 3-5c.

At Step 3-5c, the control calculator 012 sets the value in which 1 is added to the value of the counter N to the counter N. After that, the process goes on to Step 3-6.

At Step 3-6, the photographing distance range of the focusing lens is set according to the Nth peak of the AF evaluation value in the number of Nmax peaks of the AF evaluation values calculated and recorded at Step 3-5a, and the focusing lens is moved to the lens position within this photographing distance range.

In addition, the photographing distance range can be previously set by a photographer, or can be automatically set according to the condition of the aperture stop and shutter unit 022, the condition of the photographing lens 021, or the information regarding the exposure condition.

In the present embodiment, the digital camera includes the photographing distance range setting section which automatically determines the photographing distance range according to the peak graph (refer to FIG. 27A) of the AF evaluation values. More particularly, the graph width such as a half width of the peak graph is used.

At Step 3-7, the photographing distance range set at Step 3-6 is displayed on the LCD display 008 by the photographing distance range display section.

At Step 3-8, it is determined whether or not the counter N is N≦Nmax. If the counter N is not N≦Nmax (in this case N=Nmax+1), the process goes back to Step 3-2. On the other hand, if the counter N is N≦Nmax, the process goes on to Step 3-9.

At Step 3-9, it is determined whether or not the half-pressing state of the release button SW1 is maintained. If the half-pressing state of the release button SW1 is not maintained, the process goes back to Step 3-3. On the other hand, if the half-pressing state of the release button SW1 is maintained, the photographing standby state of the digital camera is maintained, and the process goes on to Step 3-10.

At Step 3-10, it is determined whether or not the release button SW1 is full-pressed. If the release button SW 1 is not full-pressed, the process goes back to Step 3-9. On the other hand, if the release button SW 1 is full-pressed, the process goes on to Step 3-11.

At step 3-11, so-called focus bracketing photographing is conducted, which performs the photographing a predetermined number of times or at predetermined focused position intervals while moving the focusing lens in the photographing distance range set in Step 3-6. After that, the process goes on to Step 3-12.

At Step S. 3-11, the process is completed.

As described above, every time the half-pressing operation of the release button SW1 is conducted in the photographing, a plurality of photographing distance ranges is sequentially displayed on the LCD display 008. When the release button SW1 is full-pressed, each of the images photographed by the focus bracketing in the displayed photographing distance range is recorded. By this operation, the half-pressing operation of the release button SW1 is repeated till the photographing intent is met, and the focus bracketing photographing can be conducted in the photographing distance range which meets the photographing intent by the full-pressing operation of the release button SW1 when the photographing distance range which meets the photographing intent is selected.

Accordingly, since the focus bracketing photographing can be conducted in the photographing distance range which meets the photographing intent of the photographer, the photographing can be conducted with a focused state which meets the photographer's intent, and photographing which is superior in image quality can be conducted.

By conducting the advance display of the photographing distance range and the photographing operation of the focus bracketing by the two-stage release button SW1, the first switching operation can be conducted in conjunction with the second switching operation by the single release button SW1. Accordingly, the operation performance can be improved.

Sixth Embodiment

Hereinafter, a sixth embodiment of the present invention will be described. In addition, the description will be omitted for the same or similar parts as those in the fifth embodiment, and the same reference numbers are applied for the same or similar parts as those in the fifth embodiment.

The digital camera according to the present embodiment includes a photographing distance range setting section, which sets a plurality of photographing distance range capable of focusing on a subject from the data near the maximum AF evaluation values relative to each focused position, and a depth of field obtaining section, which obtains information regarding a depth of field in each focused position from the condition of the photographing optical system 020 (especially, the aperture stop value).

A plurality of photographing distance ranges capable of focusing on a subject is set from the maximum value data of at least two AF evaluation values which are contained in a depth of field and are close to each other. Every time the half-pressing operation of the release button. SW1 is conducted in the photographing, one of the photographing distance ranges is sequentially displayed on the LCD display 008, and the focus bracketing photographing is performed in the displayed photographing distance range when the full-pressing operation of the release button SW1 is conducted.

As illustrated in FIGS. 29B, 29C, or FIGS. 30B, 30C, in the AF area selection mode according to the present invention, similar to the AF area selection mode in the fourth embodiment, the photographing distance range in the focus bracketing photographing is displayed on the LCD display 008 before starting the focus bracketing photographing, and the focus bracketing photographing can be conducted after the photographing distance range is confirmed by a photographer.

In the present embodiment, when the release button SW1 is half-pressed the first time, if the displayed photographing distance range in which the focus bracketing photographing is conducted does not meet the photographing intent, the display of photographing distance range is sequentially changed so as to be switched (FIG. 29B→FIG. 29C, FIG. 30B→FIG. 30C) every time the half-pressing of the release button SW1 is conducted by repeating the half-pressing operation of the release button SW1. The photographer repeats this operation until the photographing intent is met. If the photographing distance range which meets the photographing intent is selected, the focus bracketing photographing is conducted by full-pressing the release button SW1.

The photographing process operation of the present embodiment is similar to the photographing process operation (the process illustrated in the flow chart in FIG. 26) in the fifth embodiment. However, according to the present invention, the operation of the photographing distance range setting section, which sets the photographing distance range for conducting the focus bracketing photographing, is different from that in the fifth embodiment, and also characteristic. Accordingly, this operation will be described according to FIGS. 29, 30.

Figure 29A:
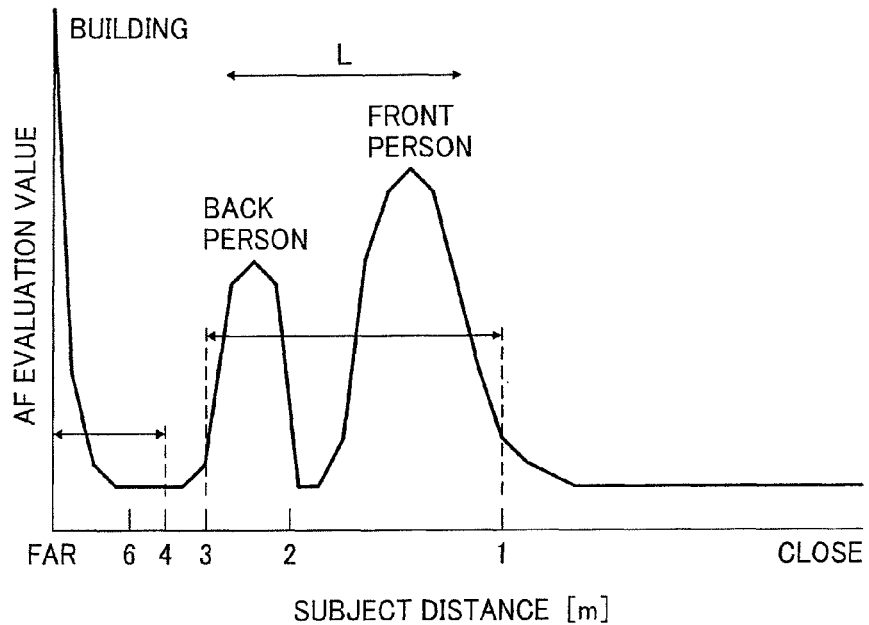
FIG. 29A is a graph illustrating a relationship between subject distances and AF evaluation values in the photographing distance range selection mode of the digital camera according to the sixth embodiment 6 of the present invention.
Figure 29B:
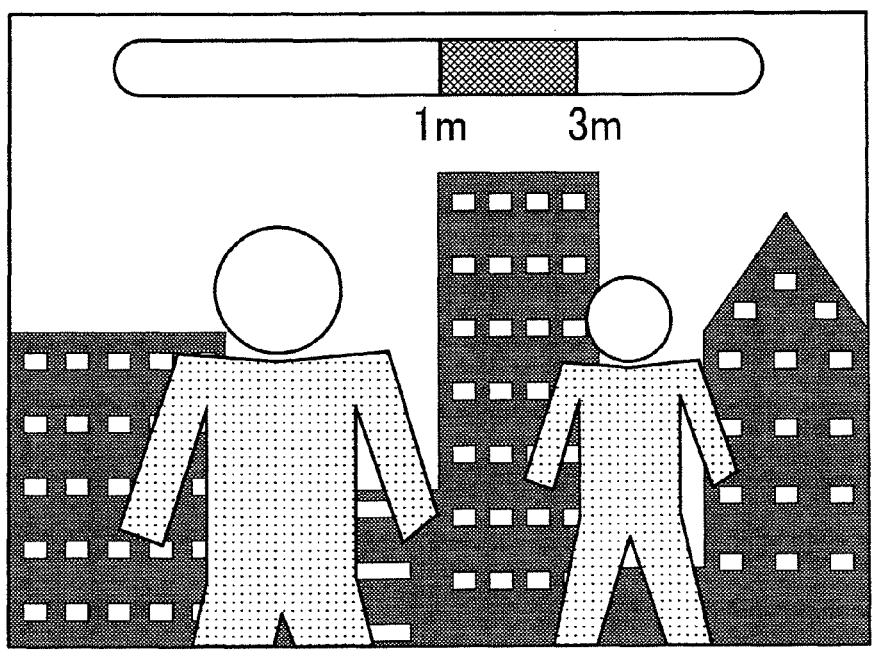
FIG. 29B is an example illustrating display in the photographing distance range confirmation mode of the digital camera according to the sixth embodiment of the resent invention.
Figure 29C:
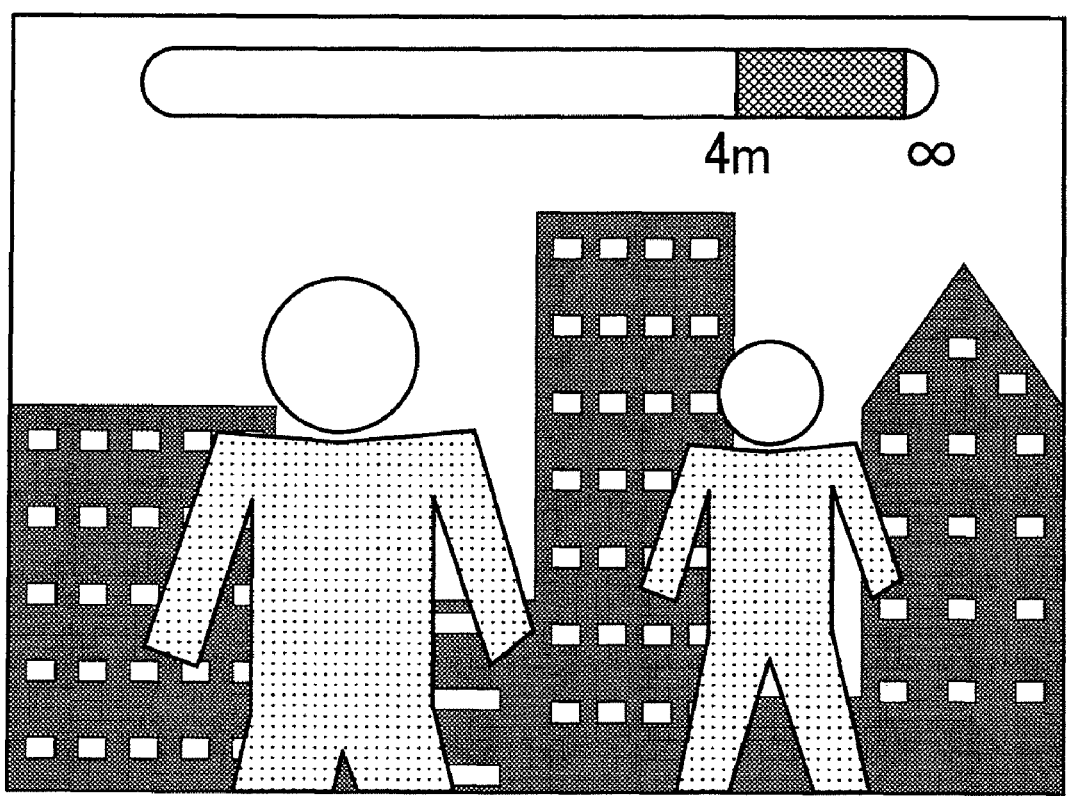
FIG. 29C is another example illustrating the display in the photographing distance range confirmation mode of the digital camera of the sixth embodiment of the present invention.

FIG. 29A is a graph which is obtained by the hill-climbing scanning before photographing, and illustrates the subject distances on the horizontal axis and the AF evaluation values on the vertical axis regarding the subjects including the front person positioned at about 1 m to 2 m, the back person positioned at about 2 m to 3 m, and the far building (refer to FIG. 29B or FIG. 29C).

The AF evaluation value data relative to the subject distances illustrated in FIG. 29A is obtained by the hill-climbing scanning just after half-pressing the release button SW1 for the first time.

In addition to this, a depth of field width L is determined from the information regarding the condition of the aperture stop and shutter unit 022 and the condition of the photographing optical system 020. In FIG. 29A, the peaks in which the width between the adjacent peaks in the peaks of the AF evaluation values is included in the depth of field width L are extracted, and the photographing distance range is set in the focused positions including the extracted peaks.

A plurality of peaks adjacent to each other in the depth of field width L in a plurality of peaks of the AF evaluation values is selected, and the photographing distance range is set to include the half width of these peaks.

As illustrated in FIG. 29B, for example, the photographing distance range of 1 m to 3 m having 2 people is displayed on the LCD display 008.

If this photographing distance range does not meet the photographer's intent, as illustrated in FIG. 29C, the photographing distance range of 4 m to infinity including the building is displayed on the LCD display 008 by half-pressing the release button SW1 again.

Then, by full-pressing the release button SW1, the focus bracketing photographing is conducted in the photographing distance range of 4 m to infinity.

Figure 30A:
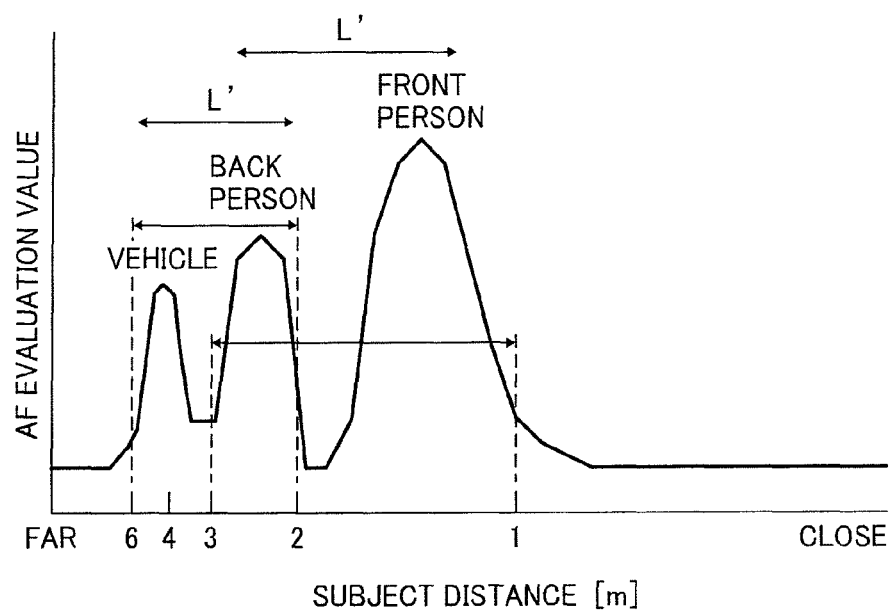
FIG. 30A is another graph illustrating the relationship between subject distances and AF evaluation values in the photographing distance range selection mode of the digital camera according to the sixth embodiment of the present invention.
Figure 30B:
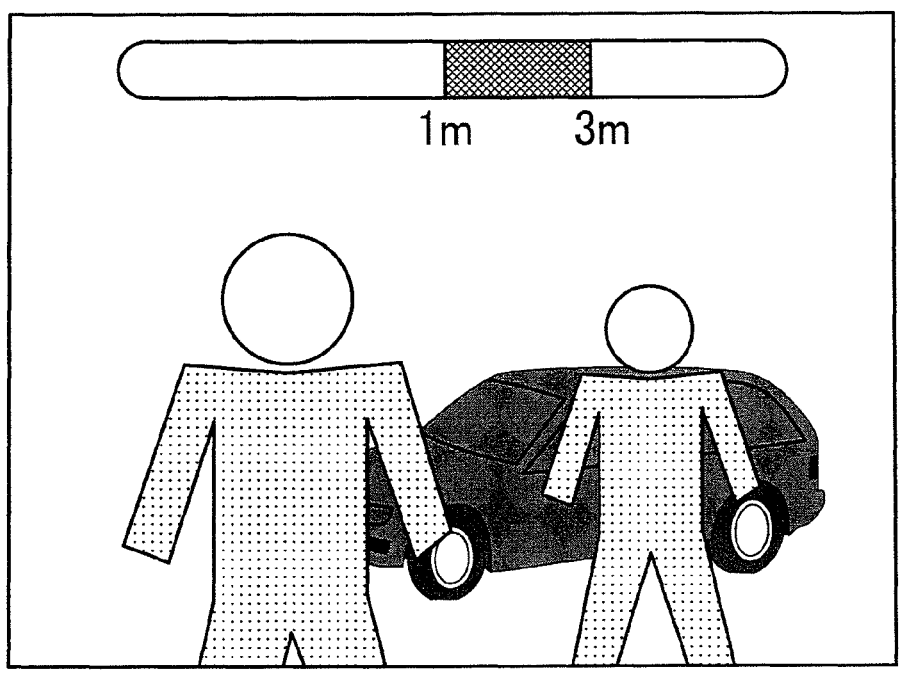
FIG. 30B is another example illustrating the display in the photographing distance range confirmation mode of the digital camera according to the sixth embodiment of the present invention.
Figure 30C:
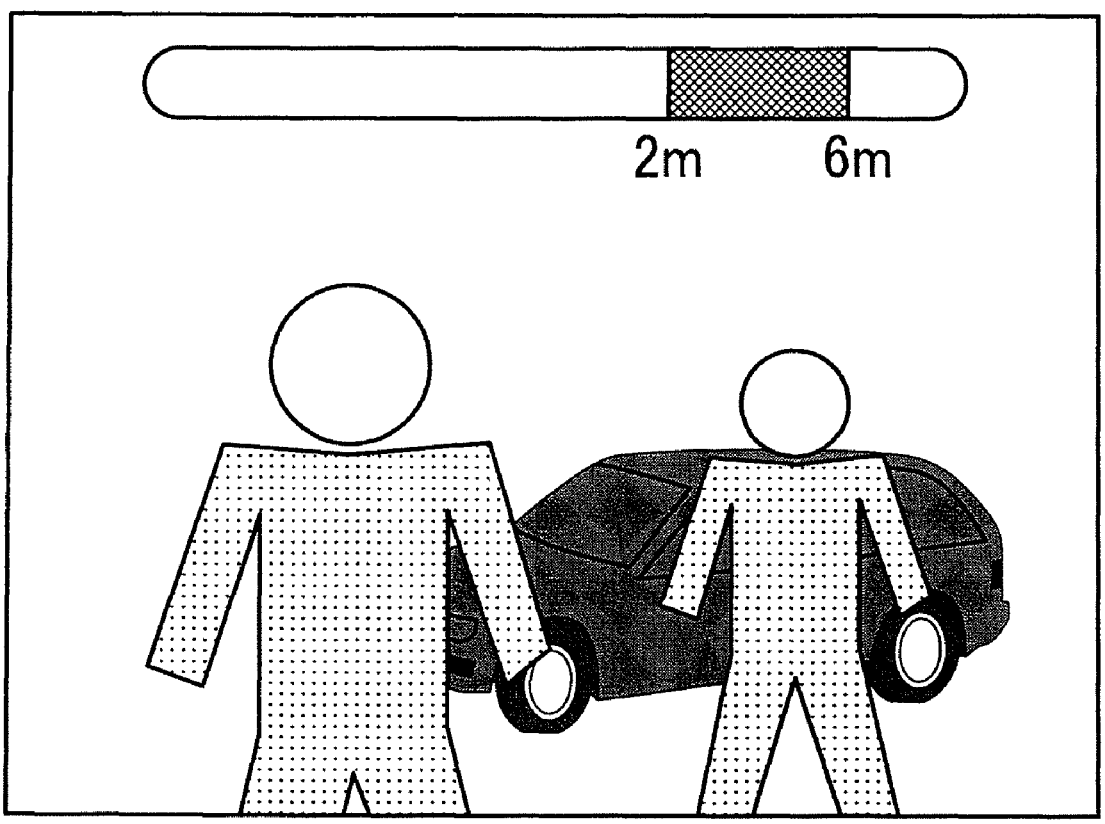
FIG. 30C is another example illustrating the display in the photographing distance range confirmation mode of the digital camera according to the sixth embodiment of the present invention.

An example of the subjects in addition to the above-described subjects is illustrated in FIGS. 30A-30C.

In FIGS. 30A-30C, the subjects are illustrated by the front person located in about 1 m to 2 m, the back person located at about 2 m to 3 m, and the vehicle located at about 4 in to 6 m.

Just after the release button SW1 is half-pressed the first time, the AF evaluation value data illustrated in FIG. 30A is obtained by the hill-climbing scanning.

In addition to this, the depth of field width L' is determined from the information regarding the condition of the aperture stop and shutter unit 022 and the condition of the photographing optical system 020. The peaks in which the width between the adjacent peaks in the peaks of the AF evaluation values is included in the depth of field width L' are extracted, and the photographing distance range is set in the focused positions including the extracted peaks.

As illustrated in FIG. 30B, for example the photographing distance range of 1 m to 3 m having two people is displayed on the LCD display 008.

If this photographing distance range does not meet the photographer's intent, as illustrated in FIG. 30C, the photographing distance range of 2 m to 6 m including the back person and the vehicle is displayed on the LCD display 008 by half-pressing the release button SW1 again.

Then, by full-pressing the release button SW1, the focus bracketing photographing is conducted in the photographing distance range of 2 m to 6 m.

As described above, by changing the selection of the photographing distance range for photographing according to a subject from the information obtained by one-time hill-climbing scanning, the photographing distance range which meets the photographing intent can be displayed by as few numbers of half-pressing times as possible.

Figure 28:
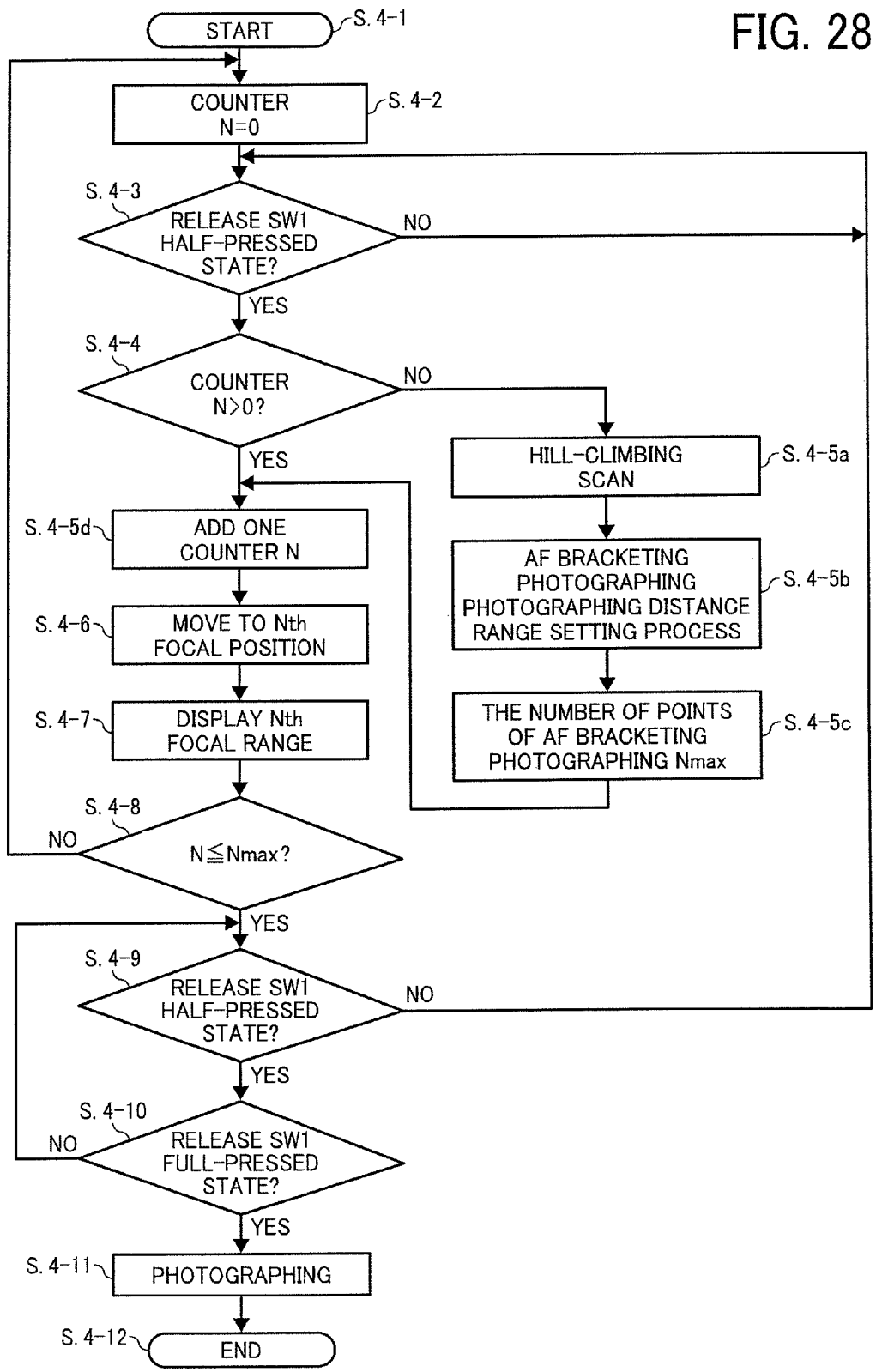
FIG. 28 is a flow chart describing a photographing distance range selection mode of the digital camera according to sixth the embodiment of the present invention.

FIG. 28 illustrates the flow chart of the photographing distance range selection mode.

At Step 4-1, the process of the photographing distance range selection mode is started.

At Step 4-2, the counter N is set to the initial value 0.

At Step 4-3, it is determined whether or not the release button SW1 is half-pressed or not. If the release button SW1 is not half-pressed, the process goes back to Step 4-3. On the other hand, if the release button SW1 is half-pressed, the process goes on to Step 4-4.

At Step 4-4, it is determined whether or not the value of the counter N is N>0. If the value of the counter N is not N>0 (in this case, N=0), the process goes on to Step 4-5a. On the other hand, if the value of the counter N is N>0, the process goes on to Step 4-5d.

At Step 4-5a, the control calculator 012 performs the hill-climbing scanning process while shifting the focused position of the focusing lens of the photographing optical system 020.

More particularly, the control calculator 012 records, while moving the focusing lens from the focused position of the closest distance to the focused position in infinity, the image information, and also calculates the AF evaluation values according to the frequency information of the subject image by the AF subject frequency information obtaining section 013a.

In the present embodiment, a plurality of subject distances capable of focusing on a subject is obtained, so a plurality of peaks of the AF evaluation values is obtained. However, in the present embodiment, all of the focused positions of the subject in which the peak values in the peaks of the AF evaluation values exceed a predetermined threshold are used as the focused positions.

Then, the process goes on to the next Step 4-5b.

At Step 4-5b, the peaks which are contained in the depth of field and are close to each other are selected in the peaks of the AF evaluation values calculated at Step 4-5a, and the photographing distance range is set according to the graph width such as a half width, and the process goes on to the next Step 405c.

At Step 4-5c, the number of photographing points of the AF bracketing photographing set in the photographing distance range setting process of Step 4-5b is set to Nmax, and the process goes on to the next Step 4-5d.

At Step 4-5d, the control calculator 012 sets the counter N as a value in which 1 is added to the value of the counter N. After that the process goes on to Step 4-6.

At Step 4-6, the focusing lens is moved to the lens position in the Nth photographing distance range in the Nmax number of photographing distance ranges calculated and recorded at Step 4-5c.

At Step 4-7, the photographing distance range set at Step 4-6 is displayed on the LCD display 008 by the photographing distance range displaying section.

At Step 4-8, it is determined whether or not the counter N is N≦Nmax. If the counter N is not N≦Nmax (in this case N=Nmax+1), the process goes back to Step 4-2. On the other hand, if the counter N is N≦Nmax, the process goes on to Step 4-9.

At Step 4-9, it is determined whether or not the half-pressing state of the release button SW1 is maintained. If the half-pressing state of the release button SW is not maintained, the process goes back to Step 4-3. On the other hand, if the half-pressing state of the release button SW1 is maintained, the photographing standby state of the digital camera is maintained, and the process goes on to Step 4-11.

At Step 4-10, it is determined whether or not the release button SW 1 is half-pressed. If the release button SW1 is not full-pressed, the process goes back to Step 4-9. On the other hand, if the release button SW1 is full-pressed, the process goes on to Step 4-11.

At Step 4-11, so-called focus bracketing is performed, which conducts the photographing a predetermined number of times or at predetermined focused position intervals while moving the focusing lens in the photographing distance range set at Step 4-5b. Then, the process goes on to Step 4-12.

At Step S. 4-12, the process is completed.

As described above, every time the release button SW1 is half-pressed in the photographing, a plurality of photographing distance ranges is sequentially displayed on the display 008. When the release button SW1 is full-pressed, each of the images photographed by the focus bracketing photographing in the displayed photographing distance range is recorded. By this operation, the half-pressing of the release button SW1 is repeated until the photographing intent is met, and the focus bracketing photographing can be conducted in the photographing distance range which meets the photographing intent by Mt-pressing the release button SW1 when the photographing distance range which meets the photographing intent is selected.

As described above, since the focus bracketing photographing can be conducted in the photographing distance range which meets the photographing intent of the photographer, the photographing is conducted in the focused state which meets the photographer's intent. Accordingly, the photographing which is superior to the image quality can be conducted.

In addition, since the photographing distance range is set according to the AF evaluation value data and the depth of field information, the photographing distance range is effectively set. When the photographing distance range, which does not meet the photographing intent, is displayed, the photographing distance range which appropriately meets the intent can be smoothly selected by the photographer.

Moreover, by displaying the photographing distance range and conducting the focus bracketing photographing operation by means of the two-stage release button SW1, the first switching operation and the second switching operation are sequentially conducted by the single release button SW1. Therefore, the operation performance can be improved.

Furthermore, the photographing distance range is automatically selected so as to include a plurality of subjects contained in the depth of field, and the focus bracketing photographing is conducted. Accordingly, the possibility of a subject intended by a photographer being contained in the frame is increased, and the operation performance is improved.

In addition, in the above embodiments, the switching between the focus lock mode and the focus bracketing photographing mode are switched by the half-pressing state and the full-pressing state of the release button SW1. However, the switching between the focus lock mode and the focus bracketing photographing mode may be conducted by another button (switch).

As described above, the imaging device according to one embodiment of the present invention includes the autofocusing section, which moves at least a part of the imaging lens as the focusing lens, and focuses the imaging device on the subject, the photographing distance range setting section, which sets a predetermined distance range including the subject distance to the subject obtained by the autofocusing section as the photographing distance range for photographing, the continuous shooting section, which continuously photographs at a plurality of focused positions in the photographing distance range while moving and stopping the focusing lens according to input of a photographing instruction, and the display section, which displays the image of the subject focused by the autofocusing section and the photographing distance range set by the photographing distance range setting section.

According to the above structure, the imaging device and the imaging method, which can automatically set the photographing distance range of the continuous shooting target, and can confirm the photographing distance range before photographing, and also can securely focus on a desired subject by a relatively small number of images, can be provided.

More particularly, by the automatic setting, it can be previously confirmed whether or not the photographing is conducted in a desired photographing distance range, and preferable photographing can be conducted without causing errors even if the photographing is only conducted in a specified photographing distance range with the limited number of images.

Preferably, the photographing distance range is displayed on the display section when the first predetermined operation (half-pressing of release button) is conducted, and the photographing is conducted by the continuous shooting section in the photographing distance range displayed on the display section and the photographing data is recorded when the second predetermined operation (full-pressing of release button) is conducted.

According to the above structure, since the photographing can be conducted after confirming whether or not the subject is in the photographing distance range, photographing errors can be decreased. Therefore, photographing errors can be reduced and also the subject image intended by a photographer can be easily obtained. In addition, the recording area of the photographing data can be effectively used.

Preferably, the photographing distance range setting section sets a plurality of photographing distance ranges according to the maximum value of the focal point evaluation value, the plurality of photographing distance ranges is sequentially displayed on the display section for every first predetermined operation, and the photographing is conducted by the continuous shooting section in the photographing distance range displayed on the display section and photographing data is stored when the second predetermined operation is conducted.

According to the above structure, plural photographing can be conducted while changing the focused position in the photographing distance range which meets the photographing intent of the photographer, and the photographing data is recorded. Accordingly, the photographing can be conducted in the focused state intended by the photographer, and photographing which is superior in image quality can be conducted. In addition, the recording area of the photographing data can be effectively used.

Preferably, the imaging device according to one embodiment of the present invention further includes the depth of field obtaining section, which obtains information of a depth of field in the focused position. The photographing distance range setting section sets a plurality of photographing distance ranges according to at least 2 maximum values of the focal point evaluation values which are included in the depth of field obtained by the depth of field obtaining section and are adjacent to each other, the plurality of photographing distance ranges is sequentially displayed on the display section for every first predetermined operation, and the photographing is conducted by the continuous shooting section in the photographing distance range displayed on the display section and photographing data is recorded when the second predetermined operation is conducted.

According to the above structure, the photographing distance range is effectively set. The photographing distance range which appropriately meets the intent of the photographer can be smoothly selected when the photographing distance range, which does not meet the photographing intent, is displayed. In addition, the recording area of the photographing data can be effectively used.

Preferably, the display section displays the photographing distance range on which the focused position by the autofocusing section is overlapped.

According to the above structure, it can be further effectively confirmed whether or not the photographing distance range is a predetermined range by comparing the photographing distance range of the continuous shooting target with the displayed focused position.

Preferably, the imaging apparatus according to one embodiment of the present invention further includes the photographing distance range changing section, which changes the photographing distance range.

According to the above structure, even if the subject distance measured by the AF operation is shifted, the photographing distance range can be corrected. Therefore, the focus bracketing photographing in a desired photographing distance range can be conducted.

Preferably, the display section displays the photographing distance range according to changes in the photographing distance range by the photographing distance range changing section.

According to the above structure, even if the subject distance measured by the AF operation is shifted, the photographing distance range can be effectively corrected. Accordingly, the focus bracketing photographing in a desired photographing distance range can be conducted.

Preferably, the photographing distance range changing section changes the photographing distance range according to the third predetermined operation (OK button).

According to the above structure, even if the subject distance measured by the AF operation is shifted, the photographing distance range can be further effectively corrected. Therefore, the focus bracketing photographing in a desired photographing distance range can be conducted.

Preferably, the photographing distance range setting section selects a plurality of the photographing distance ranges relative to a plurality of the subject distances, and the photographing distance range changing section sequentially changes the plurality of photographing distance ranges according to the first predetermined operation.

According to the above structure, the photographing distance range can be further appropriately set according to the subject distance obtained by the AF operation. Therefore, the focus bracketing photographing can be conducted in a desired photographing distance range.

Preferably, the photographing distance range changing section changes the photographing distance range based on change in the condition of the subject according to the first predetermined operation.

According to the above structure, the photographing distance range can be further appropriately set according to the subject distance obtained by the AF operation. Therefore, the focus bracketing photographing can be conducted in a desired photographing distance range.

Preferably, the photographing distance range changing section changes the photographing distance range according to a time interval of the first predetermined operation.

According to the above structure, the photographing distance range can be further appropriately set according to the subject distance obtained by the AF operation. Therefore, the focus bracketing photographing can be conducted in a desired photographing distance range.

Preferably, the imaging device according to one embodiment of the present invention includes the warning section, which warns that the photographing distance range is not set when the predetermined photographing start instruction is detected before setting the photographing distance range by the photographing distance range setting section.

According to the above structure, the photographing of an unnecessary image in a state in which the photographing distance range is not set or the generation of abnormal operation can be effectively prevented.

Moreover, the imaging method according to one embodiment of the present invention includes the autofocusing step, which moves at least a part of the imaging lens as the focusing lens, and focuses the imaging device on the subject, the photographing distance range setting step, which sets a predetermined distance range including the subject distance to the subject obtained by the autofocusing step as the photographing distance range for photographing, the continuous shooting step, which continuously photographs at a plurality of focused positions in the photographing distance range while moving and stopping the focusing lens, and the display step, which displays the image of the subject focused by the autofocusing step and the photographing distance range set by the photographing distance range setting step.

According to the above method, it can be confirmed whether or not a desired photographing distance range is photographed by the AF operation. Even if the photographing is only conducted in a specified photographing distance range with the limited number of images, photographing without causing errors can be conducted.

Preferably, the photographing distance range is displayed by the display step when the first predetermined operation (half-pressing of release button) is conducted, and the photographing is conducted by the continuous shooting photographing step in the photographing distance range displayed by the display step and the photographing data is recorded when the second predetermined operation (full-pressing of release button) is conducted.

According to the above method, the photographing can be conducted after confirming whether or not the subject is in the photographing distance range. Therefore, photographing errors can be reduced, and also the subject image which meets the photographer's intent can be obtained. In addition, the recording area of the photographing data can be effectively used.

Preferably, the photographing distance range setting step sets a plurality of photographing distance ranges according to the maximum value of the focal point evaluation value, the display step sequentially displays the plurality of photographing distance ranges for every first predetermined operation, and the photographing is conducted by the continuous shooting step in the photographing distance range displayed by the display step and photographing data is recorded when the second predetermined operation is conducted.

According to the above method, plural photographing can be conducted while changing the focused position in the photographing distance range which meets the photographing intent of the photographer, and the photographing data is recorded. Therefore, the photographing is conducted in the focused state intended by the photographer, and photographing which is superior in the image quality can be conducted. In addition, the recording area of the photographing data can be effectively used.

Preferably, the imaging method according to one embodiment of the present invention further includes a depth of field obtaining step, which obtains information of a depth of field in the focused position. The photographing distance range setting step sets a plurality of photographing distance ranges according to at least 2 maximum values of the focal point evaluation values which are included in the depth of field obtained by the depth of field obtaining step and are close to each other, the display step sequentially displays the plurality of photographing distance ranges for every first predetermined operation, and the photographing is conducted by the continuous shooting step in the photographing distance range displayed by the display step and the photographing data is recorded when the second predetermined operation is conducted.

According to the above method, the photographing distance range is effectively set, and the photographing distance range, which appropriately meets the intent of the photographer, can be smoothly selected when the photographing distance range, which does not meet the photographing intent, is displayed. In addition, the recording area of the photographing data can be effectively used.

Preferably, the display step images the photographing distance range on which the focused position by the autofocusing step is overlapped.

According to the above method, it can be further effectively confirmed whether or not the photographing distance range is a desired range by comparing the photographing distance range of the continuous shooting target with the displayed focused position.

Preferably, the imaging method according to one embodiment of the present invention includes the photographing distance range changing step, which changes the photographing distance range.

According to the above method, even if the subject distance measured by the AF operation is shifted, the photographing distance range can be corrected. Therefore, the focus bracketing photographing can be conducted in a desired photographing distance range.

Preferably, the display step changes the photographing distance range according to changes in the photographing distance range by the photographing distance range changing step.

According to the above method, even if the subject distance measured by the AF operation is shifted, the photographing distance range can be effectively corrected. Therefore, the focus bracketing photographing can be conducted in a desired photographing distance range.

Preferably, the photographing distance range changing step changes the photographing distance range according to a third predetermined operation.

According to the above method, even if the subject distance measured by the AF operation is shifted, the photographing distance range can be further effectively corrected. Therefore, the focus bracketing photographing can be conducted in a desired photographing distance range.

Preferably, the photographing distance range setting step selects a plurality of the photographing distance ranges relative to a plurality of the subject distances, and the photographing distance range changing step sequentially changes the plurality of photographing distance ranges according to the first predetermined operation.

According to the above method, the photographing distance range can be further appropriately set according to the subject distance measured by the AF operation. Therefore, the focus bracketing photographing can be conducted in a desired photographing distance range.

Preferably, the photographing distance range changing step changes the photographing distance range based on change in the condition of the subject according to the first predetermined operation.

According to the above method, the photographing distance range can be further appropriately set according to the subject distance measured by the AF operation. Therefore, the focus bracketing photographing can be conducted in a desired photographing distance range.

Preferably, the photographing distance range changing step changes the photographing distance range according to a time interval of the first predetermined operation.

According to the above method, the photographing distance range can be further appropriately set according to the subject distance measured by the AF operation. Therefore, the focus bracketing photographing in a desired photographing distance range can be conducted.

Preferably, the imaging device according to one embodiment of the present invention further includes a warning step, which warns that the photographing distance range is not set when a photographing start instruction is detected before setting the photographing distance range by the photographing distance range setting step.

According to the above structure, the photographing of an unnecessary image in a state in which the photographing distance range is not set and the generation of the abnormal operation can be effectively prevented.

In the above embodiments, although the imaging device is applied to a digital camera, the imaging device can be applied to a portable device such as a cellular phone with a camera and a PDA (personal digital assistants).

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging device, comprising:
    an autofocusing section, which moves at least a part of an imaging lens, and focuses the imaging lens on a subject:
    a photographing distance range setting section, which sets a predetermined distance range including a subject distance to the subject obtained by the autofocusing section as a photographing distance range for photographing;
    a continuous shooting section, which continuously photographs at different positions in the photographing distance range while moving the imaging lens according to input of a photographing instruction; and
    a display section, which displays an image of the subject focused by the autofocusing section and the photographing distance range set by the photographing distance range setting section.

2. The imaging device according to claim 1, comprising:
    an operation member, which instructs photographing, wherein
    the photographing distance range is displayed on the display section when a first predetermined operation is conducted to the operation member, and
    the photographing is conducted by the continuous shooting section in the photographing distance range displayed on the display section and photographing data is recorded when a second predetermined operation is conducted to the operation member.

3. The imaging device according to claim 1, comprising:
    an operation member, which instructs photographing, wherein
    the photographing distance range setting section sets a plurality of photographing distance ranges according to a maximum value of the focal point evaluation value, and
    the plurality of photographing distance ranges is sequentially displayed on the display section every time a first predetermined operation is conducted to the operation member, and the photographing is conducted by the continuous shooting section in the photographing distance range displayed on the display section and photographing data is stored when a second predetermined operation is conducted to the operation member.

4. The imaging device according to claim 1, further comprising:
    an operation member, which instructs photographing;
    a depth of field obtaining section, which obtains information of a depth of field in the focused position, wherein
    the photographing distance range setting section sets a plurality of photographing distance ranges according to at least 2 maximum values of the focal point evaluation values which are included in the depth of field obtained by the depth of field obtaining section and are adjacent to each other, and
    the plurality of photographing distance ranges is sequentially displayed on the display section every time a first predetermined operation is conducted to the operation member, and the photographing is conducted by the continuous shooting section in the photographing distance range displayed on the display section and photographing data is recorded when a second predetermined operation is conducted to the operation member.

5. The imaging device according to claim 1, wherein the display section displays the photographing distance range on which the focused position by the autofocusing section is overlapped.

6. The imaging device according to claim 1, further comprising a photographing distance range changing section, which changes the photographing distance range.

7. The imaging device according to claim 6, wherein the display section displays the photographing distance range according to change in the photographing distance range by the photographing distance range changing section.

8. The imaging device according to claim 6, comprising:
    an operation member, which instructs photographing, wherein
    the photographing distance range setting section selects a plurality of the photographing distance ranges relative to a plurality of the subject distances, and
    the photographing distance range changing section sequentially changes the plurality of photographing distance ranges according to a first predetermined operation of the operation member.

9. The imaging device according to claim 8, wherein the photographing distance range changing section changes the photographing distance range based on change in a condition of the subject according to the first predetermined operation of the operation member.

10. The imaging device according to claim 8, wherein the photographing distance range changing section changes the photographing distance range according to a time interval of the first predetermined operation of the operation member.

11. The imaging device according to claim 1, further comprising a warning section, which warns that the photographing distance range is not set when a predetermined photographing start instruction is detected before setting the photographing distance range by the photographing distance range setting section.

12. An imaging method, comprising:
an autofocusing step, which moves at least a part of an imaging lens, and focuses the imaging lens on a subject;
a photographing distance range setting step, which sets a predetermined distance range including a subject distance to the subject obtained by the autofocusing step as a photographing distance range for photographing;
a continuous shooting step, which continuously photographs at different positions in the photographing distance range while moving the imaging lens; and
a display step, which displays an image of the subject focused by the autofocusing step and the photographing distance range set by the photographing distance range setting step.

13. The imaging method according to claim 12, wherein
the photographing distance range is displayed by the display step when a predetermined operation, which starts autofocusing, is conducted, and
the photographing is conducted by the continuous shooting photographing step in the photographing distance range displayed by the display step and the photographing data is recorded when a predetermined operation, which starts photographing, is conducted.

14. The imaging method according to claim 12, wherein
the photographing distance range setting step sets a plurality of photographing distance ranges according to a maximum value of the focal point evaluation value, and
the display step sequentially displays the plurality of photographing distance ranges every time a predetermined operation, which starts autofocusing, is conducted, and
the photographing is conducted by the continuous shooting step in the photographing distance range displayed by the display step and photographing data is recorded when a predetermined operation, which starts photographing, is conducted.

15. The imaging method according to claim 12, further comprising a depth of field obtaining step, which obtains information of a depth of field in the focused position, wherein
the photographing distance range setting step sets a plurality of photographing distance ranges according to at least 2 maximum values of the focal point evaluation values which are included in the depth of field obtained by the depth of field obtaining step and are close to each other, and
the display step sequentially displays the plurality of photographing distance ranges every time a predetermined operation, which starts autofocsing, is conducted, and
the photographing is conducted by the continuous shooting step in the photographing distance range displayed by the display step and the photographing data is recorded when a predetermined operation, which starts photographing, is conducted.

16. The imaging method according to claim 12, wherein the display step images the photographing distance range on which the focused position by the autofocusing step is overlapped.

17. The imaging method according to claim 12, further comprising a photographing distance range changing step, which changes the photographing distance range.

18. The imaging method according to claim 17, wherein
the photographing distance range setting step selects a plurality of the photographing distance ranges relative to a plurality of the subject distances, and
the photographing distance range changing step sequentially changes the plurality of photographing distance ranges according to a predetermined operation, which starts autofocusing the operation member.

19. The imaging method according to claim 18, wherein the photographing distance range changing step changes the photographing distance range based on change in a condition of the subject according to the predetermined operation, which starts autofocusing.

20. The imaging method according to claim 18, wherein the photographing distance range changing step changes the photographing distance range according to a time interval of the predetermined operation, which starts autofocusing.

* * * * *